(12) United States Patent  
Mitsuno et al.

(10) Patent No.: US 9,098,212 B2  
(45) Date of Patent: Aug. 4, 2015

(54) COMPUTER SYSTEM WITH STORAGE APPARATUSES INCLUDING PHYSICAL AND VIRTUAL LOGICAL STORAGE AREAS AND CONTROL METHOD OF THE COMPUTER SYSTEM

(75) Inventors: Takanori Mitsuno, Odawara (JP); Atsushi Murase, Odawara (JP)

(73) Assignee: Hitachi, Ltd., Tokyo (JP)

( * ) Notice: Subject to any disclaimer, the term of this patent is extended or adjusted under 35 U.S.C. 154(b) by 1027 days.

(21) Appl. No.: 13/128,815

(22) PCT Filed: Apr. 26, 2011

(86) PCT No.: PCT/JP2011/002458  
§ 371 (c)(1),  
(2), (4) Date: May 11, 2011

(87) PCT Pub. No.: WO2012/147127  
PCT Pub. Date: Nov. 1, 2012

(65) Prior Publication Data  
US 2012/0278561 A1   Nov. 1, 2012

(51) Int. Cl.  
*G06F 12/00* (2006.01)  
*G06F 13/00* (2006.01)  
*G06F 13/28* (2006.01)  
*G06F 3/06* (2006.01)

(52) U.S. Cl.  
CPC .............. *G06F 3/067* (2013.01); *G06F 3/0605* (2013.01); *G06F 3/0631* (2013.01); *G06F 3/0635* (2013.01); *G06F 3/0665* (2013.01)

(58) Field of Classification Search  
None  
See application file for complete search history.

(56) References Cited

U.S. PATENT DOCUMENTS

| 7,240,156 B2 * | 7/2007 | Hoshino et al. ............... 711/114 |
| 2003/0110263 A1 | 6/2003 | Shillo |
| 2007/0055704 A1 * | 3/2007 | Watanabe et al. ............ 707/200 |
| 2007/0288700 A1 * | 12/2007 | Tamura et al. ................ 711/147 |

FOREIGN PATENT DOCUMENTS

| EP | 1 868 075 A2 | 12/2007 | |
| EP | 1868075 A2 * | 12/2007 | ................ G06F 3/06 |
| JP | 2005-512232 | 4/2005 | |
| WO | WO 2010/095176 A1 | 8/2010 | |

OTHER PUBLICATIONS

PCT International Search Report and Written Opinion on application No. PCT/JP2011/002458 dated Dec. 12, 2011; 10 pages.

* cited by examiner

*Primary Examiner* — Charles Rones  
*Assistant Examiner* — Matthew Chrzanowski  
(74) *Attorney, Agent, or Firm* — Foley & Lardner LLP

(57) ABSTRACT

To create one pool by using a plurality of storage apparatuses and to provide virtual volumes common to each of the storage apparatuses to the server. The respective logical volumes 220 which the plurality of storage apparatuses 10 (i) to (3) comprise are mutually connected. The respective logical volumes are managed in the one pool 230. The virtual volumes 240 are created by utilizing the storage area in the pool. Each of the storage apparatuses shares at least part of the management information related to the page assignment for the virtual volumes with the other storage apparatuses.

6 Claims, 27 Drawing Sheets

FIG. 7

| Owner right management table | |
|---|---|
| Virtual LU# | Storage apparatus# |
| LUA | Storage 10 (1) |
| LUB | Storage 10 (2) |
| LUC | Storage 10 (3) |
| ... | ... |

Logical volume - external volume conversion table

| Logical volume# (C120) | Storage apparatus# (C121) | LDEV# (C122) |
|---|---|---|
| LDEV 0 | Storage 10 (1) | LDEV 0 |
| ExVOL 0 | Storage 10 (2) | LDEV 0 |
| ExVOL 1 | Storage 10 (3) | LDEV 0 |
| ExVOL 2 | Storage 10 (3) | LDEV 1 |
| ... | ... | ... |

FIG. 9

| Logical volume - external volume conversion table | | |
|---|---|---|
| Logical volume# (C120) | Storage apparatus# (C121) | LDEV# (C122) |
| LDEV 0 | Storage 10 (2) | LDEV 0 |
| ExVOL 0 | Storage 10 (1) | LDEV 0 |
| ExVOL 1 | Storage 10 (3) | LDEV 0 |
| ExVOL 2 | Storage 10 (3) | LDEV 1 |
| ... | ... | ... |

Logical volume - external volume conversion table — T12(3)

| Logical volume# (C120) | Storage apparatus# (C121) | LDEV# (C122) |
|---|---|---|
| LDEV 0 | Storage 10 (3) | LDEV 0 |
| LDEV 1 | Storage 10 (3) | LDEV 1 |
| ExVOL 0 | Storage 10 (1) | LDEV 0 |
| ExVOL 1 | Storage 10 (2) | LDEV0 |
| ... | ... | ... |

FIG. 11

Pool address management table T15(1)

| Pool# C150 | Pool page address C151 | Assignment status C152 | Volume# C153 | Page address C154 | Assignment destination virtual LU# C155 |
|---|---|---|---|---|---|
| 230(1) | 0x00 | Assigned | LDEV 0 | 0x00 | LUA |
| | 0x01 | Assigned | | 0x01 | LUA |
| | 0x02 | Unassigned | | 0x02 | - |
| | ... | ... | ... | ... | ... |
| | 1x00 | Assigned | ExVOL 0 | 0x00 | LUB |
| | 1x01 | Assigned | | 0x01 | LUA |
| | 1x02 | Unassigned | | 0x02 | - |
| | ... | ... | ... | ... | ... |
| | 2x00 | Assigned | ExVOL 1 | 0x00 | LUC |
| | 2x01 | Assigned | | 0x01 | LUC |
| | 2x02 | Assigned | | 0x02 | LUA |
| | ... | ... | ... | ... | ... |

FIG. 12

Assigned address for virtual LU management table T11(1)

| C110 | C111 | C112 | C113 | C114 |
|---|---|---|---|---|
| Virtual LU# | Virtual LU page address | Assignment status | Volume# | Page address |
| LUA | 0x00 | Assigned | LDEV 0 | 0x00 |
|  | 0x01 | Assigned | LDEV 0 | 0x01 |
|  | 0x02 | Assigned | ExVOL 0 | 0x01 |
|  | 0x03 | Assigned | ExVOL 1 | 0x02 |
| ... | ... | ... | ... | ... |
| LUB | 0x00 | Assigned | ExVOL 1 | 0x00 |
|  | 0x01 | Unassigned | - | - |
|  | 0x02 | Unassigned | - | - |
| ... | ... | ... | ... | ... |
| LUC | 0x00 | Assigned | ExVOL 1 | 0x00 |
|  | 0x01 | Assigned | ExVOL 1 | 0x01 |
|  | 0x02 | Unassigned | - | - |
| ... | ... | ... | ... | ... |

FIG. 13

Logical address - physical address conversion table T14(1)

| C140<br>Volume# | C141<br>RAID group# | C142<br>RAID level | C143<br>Volume size | C144<br>Head address | C145<br>Drive type | C146<br>Drive list |
|---|---|---|---|---|---|---|
| LDEV 0 | 0 | 4D+1P | 1024 GB | 0x000000000 | SAS | HDD-0,1,2,3,4 |
| ExVOL 0 | 1 | 4D+4D | 2048 GB | 0x000000000 | SSD | HDD-0,1,2,3, 4,5,6,7 |
| ExVOL 1 | 2 | 8D+2P | 256 GB | 0x000000000 | SATA | HDD-0,1,2,3, 4,5,6,7,8,9 |
| ExVOL 2 | 2 | 8D+2P | 4096 GB | 0x020000000 | SATA | HDD-0,1,2,3, 4,5,6,7,8,9 |
| ... | ... | ... | ... | ... | ... | ... |

COMPUTER SYSTEM WITH STORAGE APPARATUSES INCLUDING PHYSICAL AND VIRTUAL LOGICAL STORAGE AREAS AND CONTROL METHOD OF THE COMPUTER SYSTEM

TECHNICAL FIELD

This invention relates to a computer system and a control method of the computer system.

BACKGROUND ART

What is called Thin Provisioning in which virtual logical volumes are prepared and, if data is actually written, a pooled storage area is assigned to the virtual logical volumes is proposed. By managing the logical volumes distributed in the system collectively in one pool, the storage resources in the system can be utilized even more efficiently (Patent Literature 1, Patent Literature 2).

CITATION LIST

Patent Literature

[PTL 1]
International Publication WO 2010/095176
[PTL 2]
Japanese Unexamined Patent Application Publication (Kohyo) No. 2005-512232

SUMMARY OF INVENTION

Technical Problem

By the first conventional technology, one storage control apparatus takes in logical volumes which the other storage control apparatus comprises as the logical volumes of the local apparatus and manages the same. By the second conventional technology, the respective logical volumes in the system are consolidated by a different management apparatus from the storage control apparatuses.

By the first conventional technology, since one storage control apparatus accepts I/O (Input/Output) requests from the computer as a representative, the load on the one storage control apparatus increases. By the second conventional technology, each time the computer accesses the logical volumes, it is required to inquire of the management apparatus. Therefore, the load on the management apparatus increases. In both of the cases, the load is concentrated on a specified apparatus, and the capability of the specified apparatus might become the bottleneck.

Therefore, the purpose of the present invention is, by mutually connecting a plurality of storage control apparatuses, to provide a computer system and a control method of the computer system capable of creating virtual logical volumes which are common to the respective storage control apparatuses and operating the same. Another purpose of the present invention is, by generating virtual logical volumes which are common to the respective storage control apparatuses, to provide a computer system and a control method of the computer system capable of appropriately controlling the updates of the assignment management information for managing logical storage areas assigned to the virtual logical volumes. Further purposes of the present invention are disclosed by the description of the embodiments explained later.

Solution to Problem

The computer system complying with one aspect for solving the above-mentioned problems is a computer system including a plurality of storage control apparatuses for providing a storage area to the computer, and each of the storage control apparatuses is mutually connected to the other storage control apparatuses. Each of the storage control apparatuses comprises a first logical storage area generated based on the physical storage area of the storage device which each of the relevant storage control apparatuses manages, a virtually generated second logical storage area which is made to correspond to the first logical storage area which the other storage control apparatus comprises, a pool managing the first logical storage area and the second logical storage area, a plurality of virtual logical volumes which are virtually generated based on the logical storage area which the pool comprises, to which a specified size of either the first logical storage area or the second logical storage area which the pool comprises is assigned each time new data is written by the computer and, at the same time, which are common to the respective storage control apparatuses, and a management unit which manages the assignment management information for managing the specified size of logical storage area assigned to the virtual logical volumes. Each of the storage control apparatuses shares at least part of the assignment management information with the other storage control apparatuses.

Each of the storage control apparatuses may also process commands related to the virtual logical volumes whose owner right indicating that the exclusive use is allowed the storage control apparatus comprises among the respective virtual logical volumes.

Each of the storage control apparatuses may also use the first logical storage area preferentially if newly writing data to the virtual logical volumes.

Each of the storage control apparatuses may also transmit the assignment management information related to the virtual logical volumes for which the storage area assignment configuration is changed among the respective virtual logical volumes to the other storage control apparatuses and update the assignment management information which the other storage control apparatuses comprise.

As the assignment management information, each of the storage control apparatuses manages first management information indicating the relationship between the first logical storage area and the respective virtual logical volumes and second management information indicating the relationship between the virtual logical volumes whose owner right the storage control apparatus comprises among the respective virtual logical volumes and the second logical storage area and, if receiving a command related to the virtual logical volumes whose owner right the storage control apparatus does not comprise among the respective virtual logical volumes, may also inquire of the storage control apparatus comprising the owner right of the virtual logical volume which is the processing target of the command among the othe storage control apparatuses and process the command.

If receiving a command related to the virtual logical volumes whose owner right the storage control apparatus does not comprise among the respective virtual logical volumes, each of the storage control apparatuses may also inquire of the storage control apparatus comprising the owner right of the virtual logical volume which is the processing target of the command among the other storage control apparatuses and process the command, furthermore acquire the assignment management information related to the virtual logical volume which is the target of the command from the storage control apparatus which is the destination of the inquiry, and update the second management information of the local apparatus based on the assignment management information.

The present invention can be configured as a management method for managing the computer system. Furthermore, the present invention can be configured as a computer program for realizing the management method. The computer program can be distributed fixedly in storage media and distributed via a communication network.

BRIEF DESCRIPTION OF DRAWINGS

FIG. 1 is an explanatory diagram showing the overview of the entire computer system.
FIG. 2 is a hardware configuration diagram of a storage apparatus.
FIG. 3 is an explanatory diagram showing the status of the mutual connection between the storage apparatuses.
FIG. 4 is an explanatory diagram showing the configuration of the virtual volumes and the pool and the stored contents of the memory in the storage apparatus.
FIG. 5 is a hardware configuration diagram of a management server.
FIG. 6 is an explanatory diagram showing a frame format of a single pool and virtual volumes which are created across the respective storage apparatuses.
[FIG. 7]
FIG. 7 is a table for managing owner rights.
[FIG. 8]
FIG. 8 is a table for managing the relationship between logical volume numbers and the storage apparatuses where the logical volumes are actually located.
[FIG. 9]
FIG. 9 is the same type of table as FIG. 8.
[FIG. 10]
FIG. 10 is the same type of table as FIG. 9.
[FIG. 11]
FIG. 11 is a table for managing page addresses in the pool.
[FIG. 12]
FIG. 12 is a table for managing pages assigned to the virtual volumes.
[FIG. 13]
FIG. 13 is a table for converting logical addresses and physical addresses.
FIG. 14 is a flowchart showing the overall operation of the storage apparatus.
FIG. 15 is a flowchart showing the write processing following FIG. 14.
FIG. 16 is a flowchart showing the overall operation of the storage apparatus regarding the Embodiment 2.
FIG. 17 is a flowchart showing the read processing following FIG. 16.
FIG. 18 is a flowchart showing the write processing following FIG. 16.
FIG. 19 is a flowchart following FIG. 18.

FIG. 20 is a flowchart showing the overall operation of the storage apparatus regarding the Embodiment 3.
FIG. 21 is a flowchart showing the read processing following FIG. 20.
FIG. 22 is a flowchart showing the write processing following FIG. 20.
FIG. 23 is a flowchart following FIG. 22.
FIG. 24 is a flowchart showing the processing for creating a virtual volume regarding the Embodiment 4.
FIG. 25 is a flowchart showing the processing for adding a logical volume to the pool regarding the Embodiment 5.
FIG. 26 is a flowchart showing the processing for deleting a virtual volume regarding the Embodiment 6.
FIG. 27 is a flowchart showing the processing for releasing a page assigned to the virtual volume.

DESCRIPTION OF EMBODIMENTS

Hereinafter, the embodiments of the present invention are explained based on the figures. Firstly, the overview of the present invention is explained with reference to FIG. 1, and subsequently the embodiments are explained with reference to FIG. 2 and subsequent figures.

Figure 1:
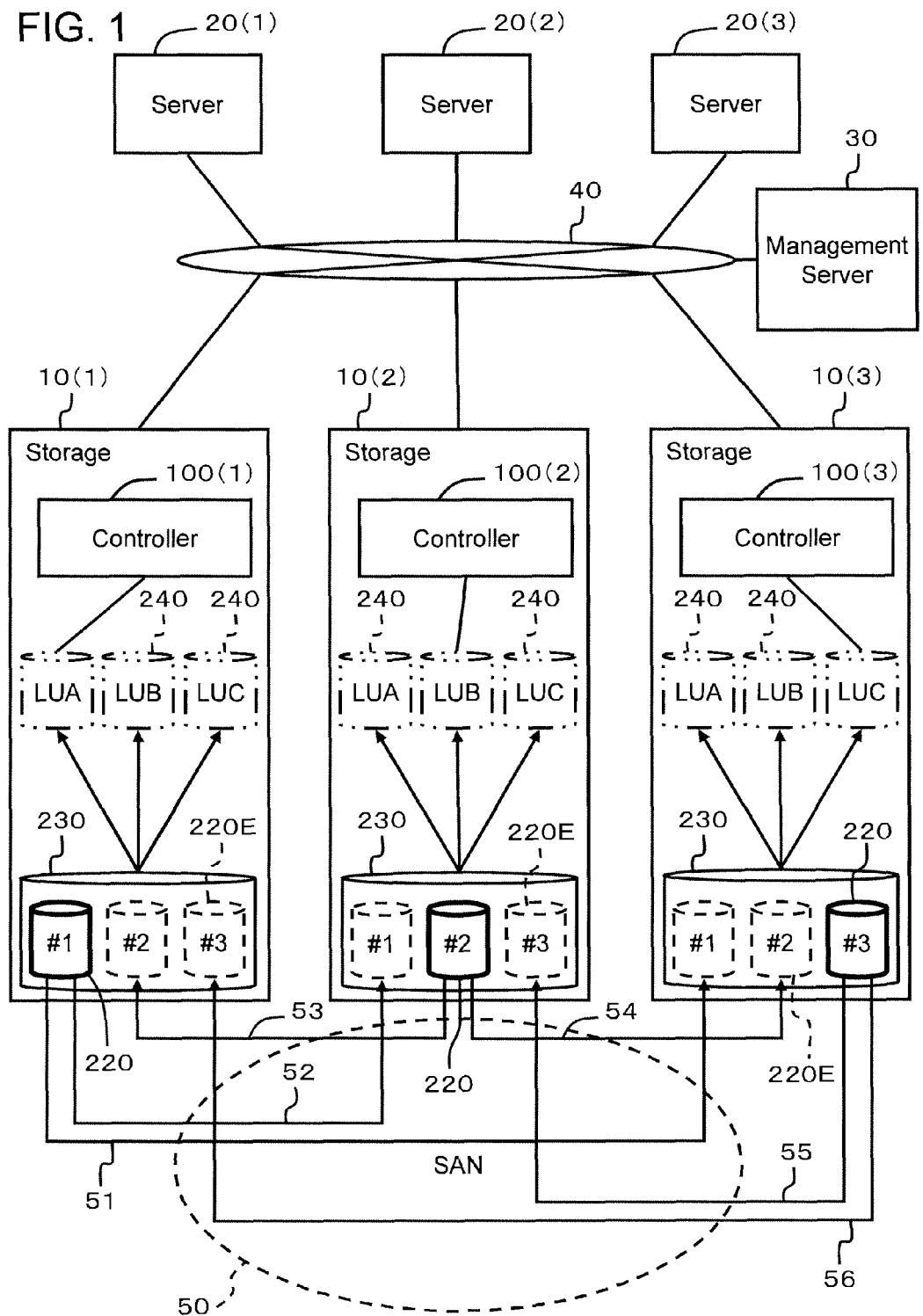
[FIG. 1]

As shown in FIG. 1, the computer system comprises, for example, a plurality of storage apparatuses 10 (1), 10 (2), and 10 (3), a plurality of servers 20 (1), 20 (2), and 20 (3), and at least one management server 30. In no distinction is necessary, the storage apparatuses 10 (1), 10 (2), and 10 (3) are referred to as storage apparatuses 10, and the servers 20 (1), 20 (2), and 20 (3) are referred to as servers 20. Controllers 100 (1), 100 (2), and 100 (3) which are explained later might also be referred to as controllers 100.

The network configuration is explained below. The respective storage apparatuses 10, the respective servers 20, and the management server 30 are connected as bi-directionally communicable via a first communication network 40. Each of the storage apparatuses 10 is connected as bi-directionally communicable with each of the other storage apparatuses via a second communication network 50. The first communication network 40 and the second communication network 50 can be configured as, for example, IP-SAN (Internet Protocol SAN) or FC-SAN (Fibre Channel-Storage Area Network).

It should be noted that the configuration where a third communication network is installed aside from the first communication network 40 and the second communication network 50 and where the management server 30, the respective storage apparatuses 10 and the respective servers 20 are connected via the third communication network may also be permitted. Otherwise, the configuration in which the first communication network 40 and the second communication network 50 are integrated and the communication for I/O, the communication for management, and the communication for external connection are performed by one communication network may also be permitted. The external connection is explained later.

The storage apparatuses 10 are equivalent to "storage control apparatuses". Each of the storage apparatuses 10 comprises a controller 100, storage devices 200 (refer to FIG. 2), logical volumes 220, 220E, a pool 230, and virtual volumes

240. The virtual volumes might be abbreviated to "virtual LUs" in the figures. The detailed configuration of the storage apparatuses 10 is explained later.

The controller 100 controls the operation of the storage apparatus 10. The controller 100, for example, processes the I/O requests from the server 20, and transmits the processing result to the server 20. Furthermore, the controller 100 creates the virtual volumes 240 by utilizing the logical storage area which the pool 230 comprises. Furthermore, the controller 100 shares at least part of the information for managing the virtual volumes 240 with the other controllers 100.

Each of the storage apparatuses 10 comprises a pool 230. The logical volumes 220 (#1), 220 (#2), and 220 (#3) which each of the storage apparatuses 10 in the system comprises are registered in the pool 230. The pool 230 is common through the respective storage apparatuses 10. The same logical volumes (#1-#3) are registered respectively in the pool 230 which each of the storage apparatuses 10 comprises. The logical volumes 220 (#1), 220 (#2), 220 (#3) are hereinafter referred to as the logical volumes 220 (#1, #2, #3).

In other words, each of the storage apparatuses 10 respectively comprises the pool 230 but, from the perspective of the entire computer system, the computer system comprises the single pool 230 which is common to the respective storage apparatuses 10. This is because the logical volumes 220 (#1, #2, #3) distributed in the respective storage apparatuses 10 are registered in the single pool 230.

It should be noted that each of the storage apparatuses 10 may also comprise one or more logical volumes not belonging to the pool 230 (not shown in the figure). Each of the storage apparatuses 10 can provide the regular logical volumes 220 to the server 20 by the regular method. As another method, each of the storage apparatuses 10 can also comprise unused volumes (not shown in the figure). The unused volumes are created, for example, by the instruction from the management server 30. If the capacity of the pool 230 becomes small, the unused volumes can be added to the pool 230.

In the example shown in FIG. 1, a logical volume 220 (#1), an external volume 220E (#2), and an external volume 220E (#3) are registered in the pool 230 of the storage apparatus 10 (1).

The logical volume 220 is a logical storage area created by utilizing the storage device 200 in the storage apparatus 10 where that logical volume 220 is installed. The logical volume 220 is relevant to the "first logical storage area". The logical volume 220, whose entity exists inside the storage apparatus 10, is also referred to as an internal volume. Furthermore, the logical volume 220, whose entity actually exists in the storage apparatus 10, is also referred to as an actual volume.

The external volume 220E is a logical volume which is virtually created. The external volume 220E is relevant to the "second logical storage area". The external volume 220E is made to correspond to a logical volume 220 in a different storage apparatus 10 from the storage apparatus 10 in which the external volume 220E is installed. Specifically speaking, the external volume 220E is a virtual existence, and the logical volume 220 which is made to correspond to the external volume 220E actually stores the data.

The above description is explained by the example of FIG. 1. The external volume 220E (#2) in the storage apparatus 10 (1) is connected to the logical volume 220 (#2) in the storage apparatus (2) via an external connection path 53. The data whose write destination is the external volume 220E (#2) is actually stored in the logical volume 220 (#2). If writing the data to the external volume 220E (#2), the storage apparatus 10 (1) issues a write command to the logical volume 220 (#2) which is made to correspond to the external volume 220E (#2). If reading the data from the external volume 220E (#2), the storage apparatus 10 (1) issues a read command to the logical volume 220 (#2) and reads the data from the logical volume 220 (#2).

Making the logical volumes 220 which the other storage apparatuses 10 comprise correspond to the external volumes 220E is hereinafter referred to as "external connection". The storage apparatus 10 comprising the external volume 220E is referred to as a "connection source apparatus" and the storage apparatus 10 comprising the logical volume 220 connected to the external volume 220E is referred to as a "connection destination apparatus". As for the computer system by the present embodiment, the respective storage apparatuses 10 are externally connected mutually and therefore both the connection source apparatuses and the connection destination apparatuses at the same time.

The condition of the other external connection is explained. The external volume 220E (#3) in the storage apparatus 10 (2) is connected to the logical volume 220 (#3) in the storage apparatus 10 (3) via an external connection path 56.

The external volume 220E (#1) in the storage apparatus 10 (2) is connected to the logical volume 220 (#1) in the storage apparatus 10 (1) via an external connection path 52. The other external volume 220E (#3) in the storage apparatus 10 (2) is connected to the logical volume 220 (#3) in the storage apparatus 10 (3) via an external connection path 55.

The external volume 220E (#1) in the storage apparatus 10 (3) is connected to the logical volume 220 (#1) in the storage apparatus 10 (1) via an external connection path 51. The other external volume 220E (#2) in the storage apparatus 10 (3) is connected to the logical volume 220 (#2) in the storage apparatus 10 (2) via an external connection path 54.

The external connection paths 51, 52, 53, 54, 55, and 56 are communication paths used for external connection and are installed in the second communication network 50. The ports in the connection source apparatuses comprise the initiator attribute and the ports in the connection destination apparatuses comprise the target attribute.

The virtual volumes 240 are relevant to the "virtual logical volumes". The virtual volumes 240 are volumes which are virtually generated. The virtual volumes 240 are created by using the storage areas which the respective logical volumes 220 (#1, #2, #3) registered in the pool 230 comprise. By using the one pool 230, in accordance with a write command for each of the plurality of virtual volumes 240 (LUA, LUB, LUC), the storage area is assigned to the relevant virtual volume 240.

The virtual volumes 240 are connected to the servers 20 and are the access targets of the servers 20. The servers 20 can issue write commands whose write destinations are the virtual volumes 240.

The virtual volumes 240 do not comprise the storage area until the write data is actually written. If a write command for writing new data is issued, unused pages are selected from the respective logical volumes 220 registered in the pool 230. The unused pages are assigned to the write destination addresses in the virtual volumes 240. The write data received from the server 20 is written to the unused pages assigned to the virtual volumes 240. The pages are the logical storage areas of a "specified size".

The storage apparatus 10 can assign logical volumes 220 in the local apparatus preferentially to the virtual volumes 240.

This is because the processing is completed faster by writing data to the internal volumes 220 than by writing data to the external volumes 220E.

If the pages in the external volumes 220E are assigned to the virtual volumes 240, the storage apparatus 10 creates a write command for the other storage apparatuses 10. The other storage apparatuses 10 are the storage apparatuses 10 comprising the logical volumes 220 corresponding to the external volumes 220E and are the connection destination apparatuses.

The storage apparatus 10 as the connection source apparatus must transmit a write command to the storage apparatus 10 as the connection destination apparatus and receive the processing result of the same. Therefore, if the pages in the external volumes 220E are assigned to the virtual volumes 240 and the data is written to the pages in the external volumes 220E, the overhead of the write processing increases.

Therefore, the storage apparatus 10 assigns the internal volumes 220 preferentially to the virtual volumes 240 which the local storage apparatus 10 directly manages. If the free capacity of the internal volumes 220 becomes small and in other cases, the pages in the external volumes 220E can be assigned to the virtual volumes 240.

The virtual volumes 240 which the storage apparatus 10 directly manages indicate the virtual volumes 240 which the relevant storage apparatus 10 comprises the exclusive right to use. The right is referred to as an owner right. The virtual volumes 240 and the controllers 100 comprising the owner right are connected by lines in FIG. 1. The storage apparatus 10 (1) comprises the owner right of the virtual volume 240 (LUA). The storage apparatus 10 (2) comprises the owner right of the virtual volume 240 (LUB). The storage apparatus 10 (3) comprises the owner right of the virtual volume 240 (LUC).

Each of the storage apparatuses 10 basically manages the virtual volumes 240 whose owner right the local apparatus comprises. For using data for the virtual volumes 240 whose owner right the other apparatuses comprise, the storage apparatus 10 acquires the owner right from the other storage apparatuses 10. By this method, the owner right is shifted to the new storage apparatuses 10.

The management server 30 is a computer for managing the computer system. The details of the same are explained later.

[Embodiment 1]

Figure 2:
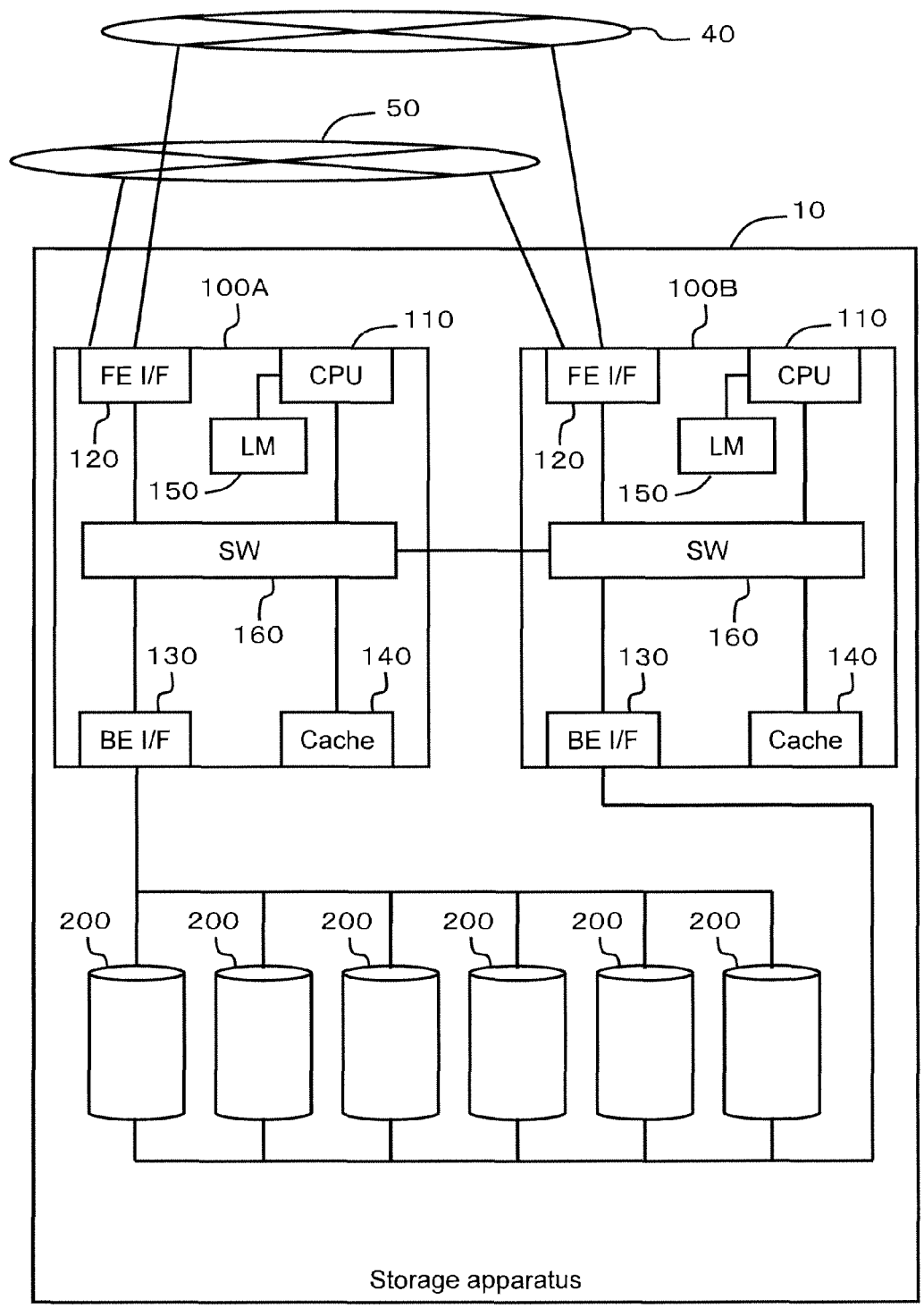
[FIG. 2]

The Embodiment 1 is explained with reference to FIG. 2 to FIG. 15. FIG. 2 shows an example of the hardware configuration of the storage apparatus 10.

The storage apparatus 10 can comprise, for example, a plurality of controllers 100A, 100B, and a plurality of storage devices 200. Each of the controllers 100A, 100B comprises the same function and can back up each other. Even if a failure occurs in one controller 100A, the other controller 100B can control the operation of the storage apparatus 10.

Each of the controllers 100A, 100B comprises, for example, a microprocessor (hereinafter referred to as a CPU) 110, a front-end interface (hereinafter referred to as an FE I/F) 120, a back-end interface (hereinafter referred to as a BE I/F) 130, a cache memory 140, a local memory 150, and an interconnection circuit (hereinafter referred to as an SW) 160.

The CPU 110 realizes the I/O processing, the virtual volume management processing, and others by performing the control programs P10 (refer to FIG. 4) stored in the local memory 150. The contents stored in the local memory 150 are explained later in FIG. 4.

For convenience, FIG. 2 is shown as if one CPU 110 is installed in one controller 100. Actually, a plurality of CPUs 110 can be installed in one controller 100. Those CPUs 110 can share and process the commands.

It should be noted that the configuration in which all the management tables T11, T12, T13, T14, and T15 are stored in the local memory 150 may also be replaced by the configuration in which a part or all of those management tables are stored in the cache memory 140. As another method, the configuration in which a part or all of the respective management tables are stored in a specified location in specified storage devices 200 may also be permitted.

The FE I/F 120 is a communication control circuit for the communication with the other apparatuses via the first communication network 40 or the second communication network 50. The BE I/F 130 is a communication control circuit for the communication with the respective storage devices 200 in the storage apparatus 10. It should be noted that, though one FE I/F 120 and one BE I/F 130 are shown in FIG. 2 for convenience, a plurality of FE I/Fs 120 and BE I/Fs 130 respectively can be installed in one controller.

The cache memory 140 stores data received from the server 20 (write data) and stores data read from the storage devices 20 (read data). It is also possible to store management information in the cache memory 140. It should be noted that it is also possible to divide the storage area of the cache memory 140 and use one of the storage areas as a cache area and the other area as an area for storing the control information.

The SW 160 is a circuit for mutually connecting the respective circuits 110, 120, 130, and 140 in the controller 100. Furthermore, the SW 160 is also connected to the SWs 160 in the other controller. Specifically speaking, the SW 160 in the controller 100A and the SW 160 in the controller 100B are connected as bi-directionally communicable. By this method, communication is possible between the respective controllers 100A, 100B.

It should be noted that, though not shown in the figure, a service processor (SVP) can be installed in each of the controllers 100A, 100B. The SVP can collect various types of information in the storage apparatus 10 and transmit the same to the management server 30.

As the storage devices 200, various types of apparatuses such as hard disk drives, semiconductor memory drives, magneto-optical disk drives, and magneto-optic disk drives which are capable of reading and writing data are available.

For using the hard disk drives, for example, FC (Fibre Channel) disks, SCSI (Small Computer System Interface) disks, SATA disks, ATA (AT Attachment) disks, SAS (Serial Attached SCSI) disks, and others are available.

Furthermore, various types of storage devices such as a flash memory, a FeRAM (Ferroelectric Random Access Memory), an MRAM (Magnetoresistive Random Access Memory), a phase-change memory (Ovonic Unified Memory), an RRAM (Resistance RAM) and others are available. Furthermore, the configuration in which different types of storage devices, for example, a flash memory and a hard disk, are mixed may also be permitted.

Figure 3:
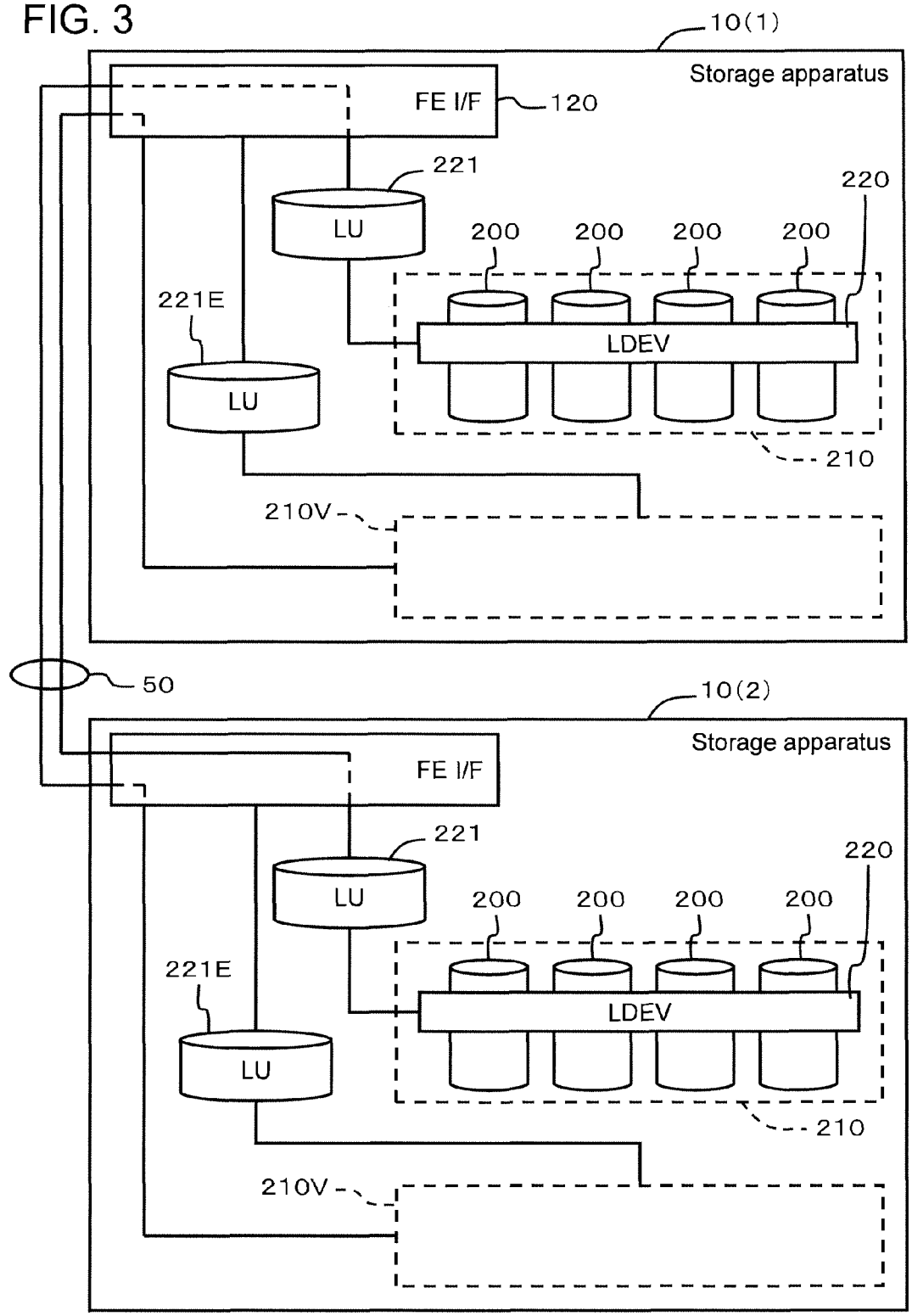
[FIG. 3]

FIG. 3 shows a frame format of the connection status between the storage apparatuses 10. FIG. 3 shows two storage apparatuses 10 (1), 10 (2) for convenience. The storage apparatus 10 (1) and the storage apparatus 10 (2) can be configured in the same manner. Therefore, the configuration of the storage apparatus 10 (1) is explained.

Each of the storage devices 200 comprises a physical storage area respectively. By integrating the physical storage areas which a plurality of storage devices 200 comprises into one, a RAID group 210 is created. The RAID group 210 comprises a RAID level such as RAID1, RAID5, and RAID6.

By the RAID group 210, the physical storage area which each of the storage devices 200 comprises is virtualized. By seeing to it that the storage area of a fixed size or a variable size from the virtualized physical storage area, a logical storage area 220 is created. Hereinafter, the logical storage area 220 is referred to as an LDEV (logical device) or a logical volume.

The LDEV 220 is made to correspond to an LUN (Logical Unit Number) 221. The LDEV 220 which is the actual volume in the storage apparatus 10 (1) is made to correspond to a virtual device (VDEV) 210V in the storage apparatus 10 (2) via the external connection path.

The external volume 220E is set in the virtual device 210V (not shown in FIG. 3). The LUN 221E is made to correspond to the external volume 220E. What is explained about the storage apparatus 10 (1) is also applied to the other storage apparatus 10 (2).

As explained above, each of the storage apparatuses 10 in the computer system externally connects the internal volumes 220 to those of each other's. The logical volumes 220 which are mutually externally connected between the storage apparatuses 10 are registered in the common single pool 230. Each of the virtual volumes 240 is created by using the storage area which the single pool 230 comprises.

Therefore, the server 20 can access the virtual volumes 240 via one of the plurality of storage apparatuses 10. However, each of the storage apparatuses 10 writes the data only to the virtual volumes 240 whose owner right the storage apparatus 10 comprises. This is for the prevention of loss of the consistency in the stored contents due to a plurality of processes of write performed simultaneously.

Figure 4:
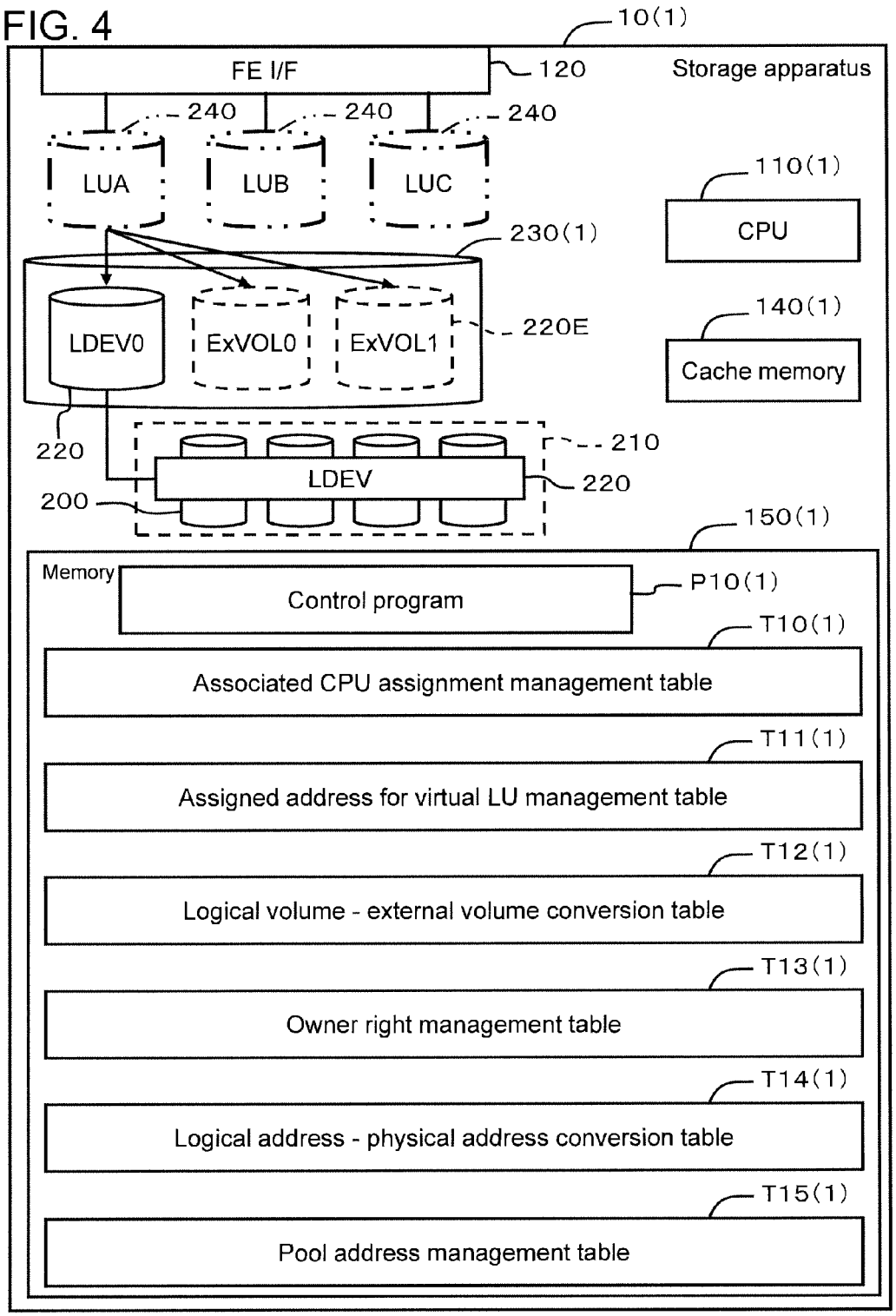
[FIG. 4]

FIG. 4 is an explanatory diagram showing the contents stored in the memory of the storage apparatus 10. As the respective storage apparatuses 10 (1), 10 (2), and 10 (3) are configured in the same manner, the storage apparatus 10 (1) is explained as an example.

In FIG. 4, the signs corresponding to the apparatus numbers are attached for being able to distinguish the configuration which the storage apparatus 10 (1) comprises from the configurations which the other storage apparatuses 10 (2), 10 (3) comprise. Those are, for example, the pool 230 (1), the CPU 110 (1), the cache memory 140 (1), the local memory 150 (1), the control program P10 (1), and the management tables T10 (1), T11 (1), T12 (1), T13 (1), T14 (1), and T15 (1). For making it explicit that the configuration is of the storage apparatus 10 (2), the sign has only to be changed from (1) to (2). Similarly, for making it explicit that the configuration is of the storage apparatus 10 (3), the sign has only to be changed from (1) to (3).

In the local memory 150 (1), for example, a control program P10 (1), an associated CPU assignment management table T10 (1), an assigned address for virtual LU management table T11 (1), a logical volume-external volume conversion table T12 (1), an owner right management table T13 (1), a logical volume-physical disk conversion table T14 (1), and a pool address management table T15 (1) can be stored.

The associated CPU management table T10 (1) is a table for managing the associated CPUs which process commands received from the servers 20. The details of the same are omitted from the explanation. The other management tables are explained later.

Figure 5:
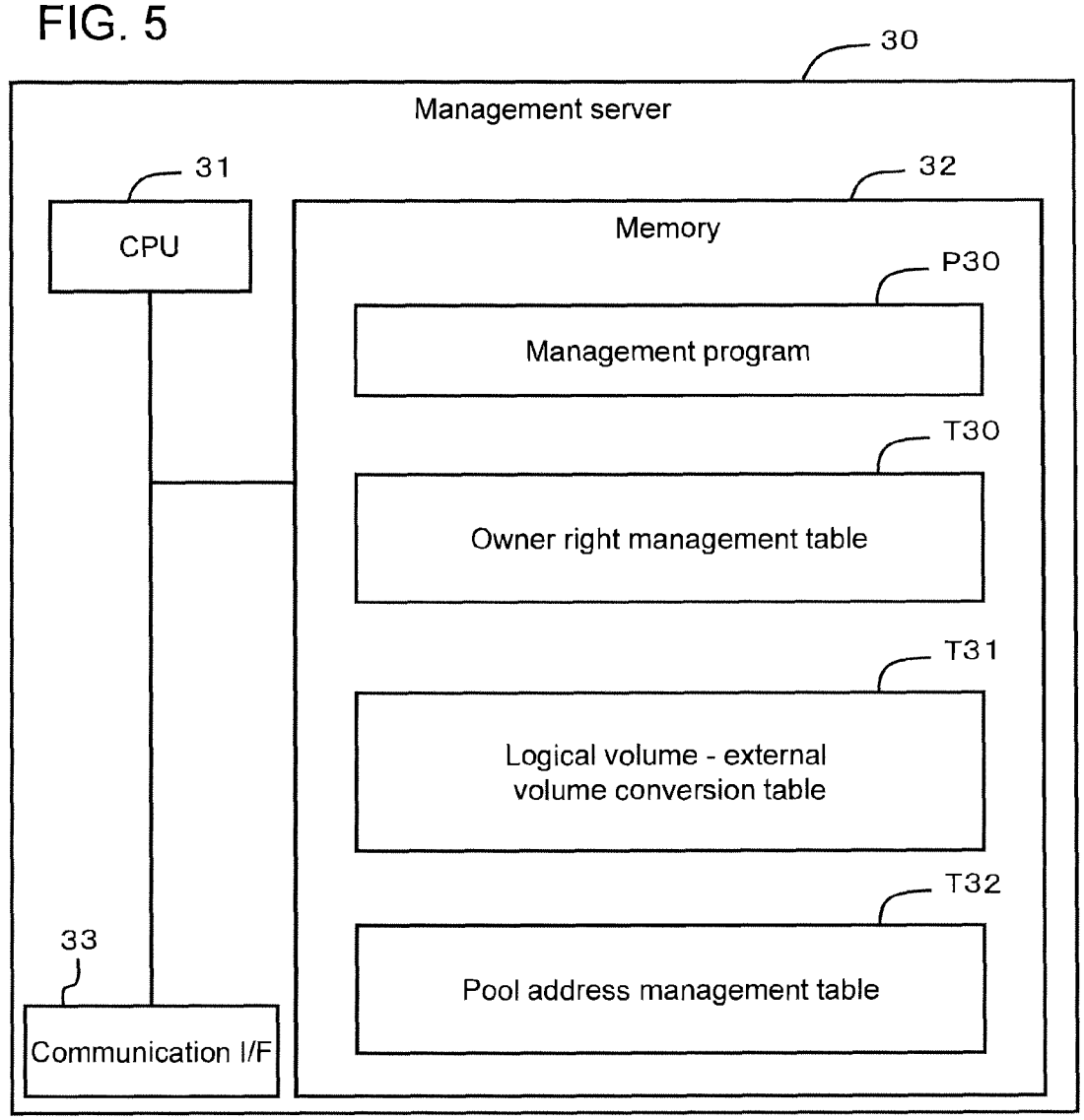
[FIG. 5]

FIG. 5 shows the hardware configuration of the management server 30 and the contents stored in the memory. The management server 30 is configured as a computer comprising, for example, a CPU 31, a memory 32, a communication interface 33, and others.

The management server 30 does not necessary have to comprise a user interface including an input device and a display device. For example, the configuration in which an operation terminal for operating the management server 30 is connected to the management server 30 may also be permitted. The configuration in which only the display terminal is connected to the management server 30 and the input device of the management server 30 is used for the operation may also be permitted. Furthermore, the management server 30 does not have to be configured as a single computer apparatus, and a plurality of computer apparatuses may also configure one management server 30.

For example, a management program P30, an owner right management table T30, a logical volume-external volume conversion table T31, and a pool address management table T32 are stored in the memory 32. The management program P30 is a computer program for collecting information from the respective servers 10 and the respective storage apparatuses 20.

Figure 6:
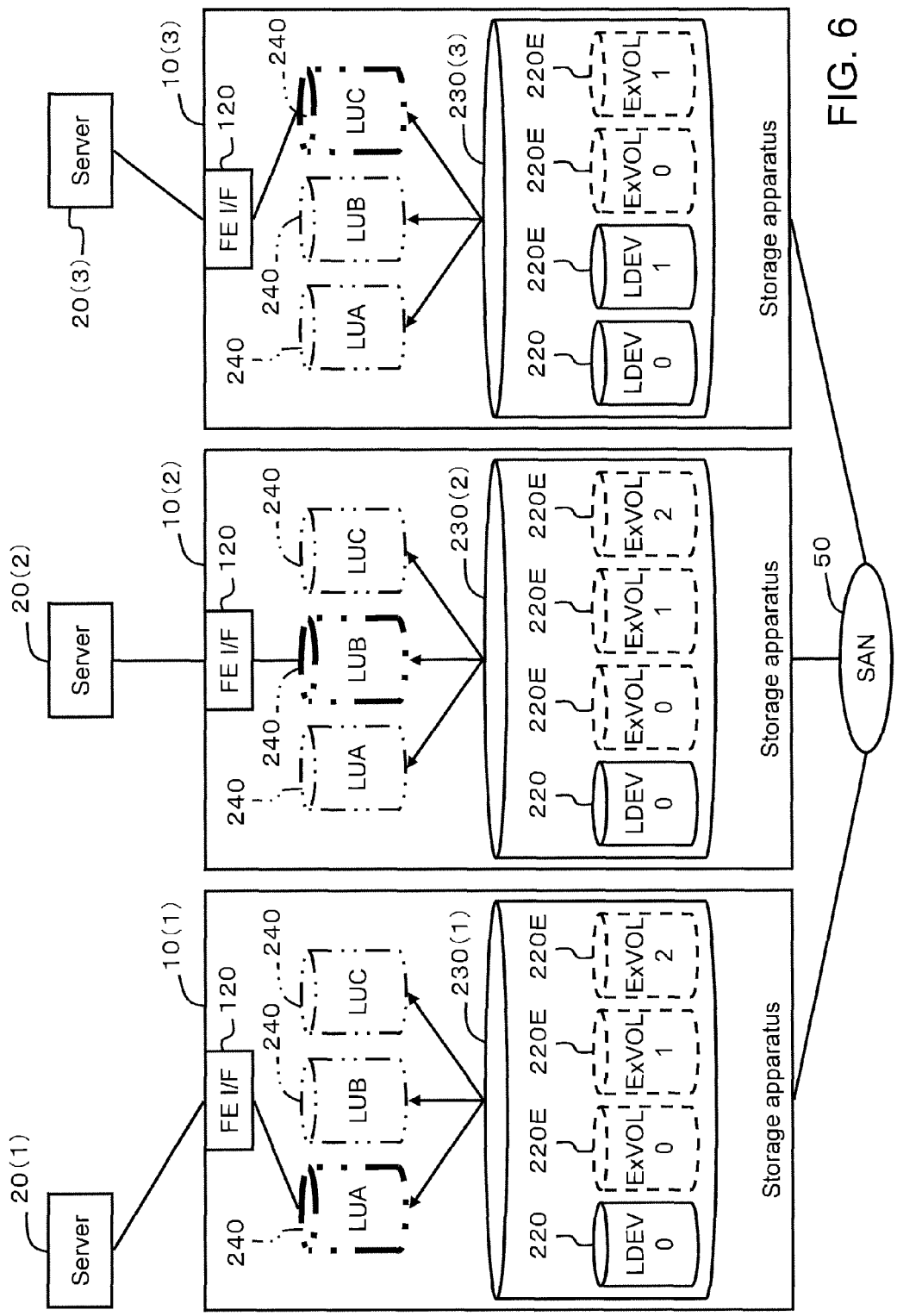
[FIG. 6]

FIG. 6 shows a frame format of the configuration of the present embodiment. In FIG. 1, the case where each of the storage apparatuses 10 comprises an internal volume 220 is explained. FIG. 6 shows the case where each of the first storage apparatus 10 (1) and the second storage apparatus 10 (2) comprises an internal volume 220 while the third storage apparatus 10 (3) comprises two internal volumes 220.

The storage apparatus 10 (1) is explained below. The storage apparatus 10 (1) comprises one internal volume 220 and three external volumes 220E. An identification number "LDEV0" is set for the internal volume 220. Identification numbers "ExVOL0", "ExVOL1", and "ExVOL2" are set for the respective external volumes 220E. Specifically speaking, in the explanation below, "LDEV" is set for the internal volumes and "ExVOL" is set for the external volumes. Each of the volume numbers is set to be unique in the storage apparatus 10.

The respective storage apparatuses 10 comprise the internal volumes 220 with the identification number "LDEV0". However, those are not the same one logical volume. Similarly, the respective storage apparatuses 10 comprise the external volumes 220E with the identification number "ExVOL0", but those are not the same one external volume. The correspondence relationship among the respective volumes is explained in FIG. 8, FIG. 9, and FIG. 10.

For convenience, FIG. 6 shows the case where the storage apparatus 10 (1) comprises the owner right of the virtual volume 240 (LUA), the storage apparatus 10 (2) comprises the owner right of the virtual volume 240 (LUB), and the storage apparatus 10 (3) comprises the owner right of the virtual volume 240 (LUC). Furthermore, in FIG. 6, the server 20 (1) uses the virtual volume 240 (LUA), the server 20 (2) uses the virtual volume 240 (LUB), and the server 20 (3) uses the virtual volume 240 (LUC). However, the configuration shown in FIG. 6 is merely an example.

FIG. 7 shows the table T13 for managing the owner rights. The owner right management table T13 comprises, for example, a virtual volume number (virtual LU#) field C130 and a storage apparatus number field C131. The identification information for uniquely identifying each of the virtual volumes 240 in the computer system is set for the virtual volume number field C130. The identification information for identifying the storage apparatus 10 comprising the owner right of the virtual volume is set for the storage apparatus number field C131. The owner right management table T30 which the management server 30 comprises is configured in the same manner.

FIG. 8 is the table T12 (1) which the first storage apparatus 10 (1) comprises for converting the logical volumes and the external volumes. The logical volume-external volume conversion table T12 (1) manages where the entities of the logical volumes registered in the pool 230 are located. The contents of the logical volume-external volume conversion table T12 vary per storage apparatus 10. Therefore, [the contents are] explained per storage apparatus 10.

The basic configuration of the logical volume-external volume conversion table T12 is explained below. This table T12, for example, makes a logical volume number field C120, a storage apparatus number field C121, and an LDEV number field C122 correspond to one another, and manages the same.

The logical volume number field C120 stores the information for identifying the respective logical volumes registered in the pool 230. The logical volumes registered in the pool 230 may also be referred to as pool volumes. Therefore, [the field] may also be referred to as a pool volume number field C120.

The information for identifying the storage apparatuses 10 comprising the internal volumes corresponding to the logical volumes in the pool 230 is set for the storage apparatus number field C121. The information for identifying the internal volumes in the storage apparatuses 10 identified by the C121 is set for the LDEV number field C122.

FIG. 6 and FIG. 8 are compared and explained. For convenience of understanding, the logical volumes registered in the pool 230 are referred to as pool volumes at this point. The pool volume 220 (LDEV0) registered in the pool 230 (1) is the logical volume 220 (LDEV0) in the storage apparatus 10 (1) as shown in FIG. 8. The entity of the pool volume 220E (ExVOL0) registered in the pool 230 (1) is the internal volume 220 (LDEV0) in the storage apparatus 10 (2). The entity of another pool volume 220E (ExVOL1) registered in the pool 230 (1) is the internal volume 220 (LDEV0) in the storage apparatus 10 (3). The entity of another pool volume 220E (ExVOL2) registered in the pool 230 (1) is the other internal volume 220 (LDEV1) which the storage apparatus 10 (3) comprises.

FIG. 9 shows the logical volume-external volume conversion table T12 (2) which the second storage apparatus 10 (2) comprises. The basic configuration of the table is the same as FIG. 8 and therefore omitted from the explanation.

The pool volume 220 (LDEV0) registered in the pool 230 (2) is the internal volume 220 (LDEV0) in the storage apparatus 10 (2). The entity of the other pool volume 220E (ExVOL0) is the internal volume 220 (LDEV0) in the storage apparatus 10 (1). Furthermore, the entity of the other pool volume 220E (ExVOL1) is the internal volume 220 (LDEV0) in the storage apparatus 10 (3). Furthermore, the entity of the other pool volume 220E (ExVOL2) is the other internal volume 220 (LDEV1) in the storage apparatus 10 (3).

FIG. 10 shows the logical volume-external volume conversion table T12 (3) which the third storage apparatus 10 (3) comprises.

The pool volume 220 (LDEV0) registered in the pool 230 (3) is the internal volume 220 (LDEV0) in the storage apparatus 10 (3). The pool volume 220 (LDEV1) is the internal volume 220 (LDEV1) in the storage apparatus 10 (3). The entity of the other pool volume 220E (ExVOL0) is the internal volume 220 (LDEV0) in the storage apparatus 10 (1). Furthermore, the entity of the other pool volume 220E (ExVOL1) is the internal volume 220 (LDEV0) in the storage apparatus 10 (2).

FIG. 11 shows the pool address management table T15 (1) which the storage apparatus 10 (1) comprises. Each of the other storage apparatuses 10 (2), 10 (3) also comprises the same type of pool address management table T15 as shown in FIG. 11. At this point, the pool address management table T15 (1) which the first storage apparatus 10 (1) comprises is explained as an example.

The pool address management table T15 (1) is a table for managing the respective pages in the pool 230 (1).

The pool address management table T15 (1), for example, makes a pool number field C150, a pool page address field C151, an assignment status field C152, a volume number field C153, a page address field C154, and an assignment destination virtual volume number field C155 correspond to one another and manages the same.

The information for identifying the pool 230 (1) is set for the pool number field C150. The addresses for identifying the pooled pages are set for the pool page address field C151. The values indicating whether the pages in the pool are assigned to the virtual volumes 240 or not are set for the assignment status field C152.

The information for identifying the logical volumes (pool volumes) registered in the pool 230 (1) is set for the volume number field C153. The addresses for identifying the pages in the pool volumes are set for the page address field C154. The information for identifying the virtual volumes 240 to which the pages in the pool volumes are assigned is set for the assignment destination virtual volume number field C155.

By using the pool address management table T15 (1), it can be ascertained which page in the pool 230 (1) corresponds to the page in which pool volume and furthermore which virtual volume 240 the page is assigned to.

FIG. 12 shows the assigned address management table T11 (1) for managing the status of page assignment to the virtual volumes in the storage apparatus 10 (1). Each of the other storage apparatuses (2), 10 (3) also comprises the same type of management table T11 as shown in FIG. 12. In FIG. 12, the management table T11 (1) which the first storage apparatus 10 (1) comprises is explained as an example.

The assigned address for virtual LU management table (1), for example, makes a virtual volume number field C110, a virtual volume page address field C111, an assignment status field C112, a volume number field C113, and a page address field C114 correspond to one another and manages the same.

The information for identifying the virtual volumes 240 is set for the virtual volume number field C110. The identification information of all the virtual volumes 240 installed in the computer system is described in the virtual volume number field C110. In the present embodiment, each of the storage apparatuses 10 has the information of the page assignment status regarding all the virtual volumes in the computer system. In the other embodiments explained later, only the specified contents of the contents shown in FIG. 12 are managed in the table T11.

The page addresses for identifying the respective pages in the virtual volumes (hereinafter also referred to as virtual pages) are set for the virtual volume page address field C111. The values indicating whether the pages in the pool 230 (1) are assigned to the virtual pages or not are set for the assignment status field C112. The information for identifying the logical volumes as the provision source of the page assigned to the virtual volume is set for the volume number field C113. The page addresses for identifying the pages assigned to the virtual pages are set for the page address field C114.

FIG. 13 shows the logical volume-physical disk conversion table T14 (1) for managing the relationship between the logical volumes 220 and the storage devices 200 in the storage apparatus 10 (1). Each of the other storage apparatuses 10 (2), 10 (3) also comprises a [logical volume-physical disk] conversion table T14 shown in FIG. 13.

The logical volume-physical disk conversion table T14, for example, comprises a volume number field C140, a RAID group number field C141, a RAID level field C142, a volume size field C143, a head address field C144, a drive type field C145, and a drive list field C146.

The information for identifying the respective logical volumes 220 is set for the volume number field C140. The information for identifying the respective RAID groups 210 is set for the RAID group number field C141. The RAID levels and the RAID configurations are set for the RAID level field C142.

The RAID levels are, for example, RAID1, 5, 6, and others. For the RAID configuration, such as 4D+1P, 4D+4D, and 8D+2P, the number of data drives and the number of parity drives are set. From the RAID configuration, the RAID level can be identified. It can be considered that 4D+1P indicates RAID5, that 4D+4D indicates RAID1, and that 8D+2P indicates RAID6. Therefore, the RAID level is not explicitly shown and only the RAID configuration is shown in FIG. 13.

The sizes of the logical volumes 220 are set for the volume size field C143. The head addresses where the logical volumes 220 are installed are set for the head address field C144. The head address is an address in the RAID group 210 and the head address where the logical volume 220 is installed.

The types of storage devices 200 configuring the RAID groups 210 are set for the drive type field C145. The types are, for example, SAS, SSD, SATA, and others. The information for identifying the storage devices 200 configuring the RAID groups 210 is set for the drive list field C146 in list form.

Figure 14:
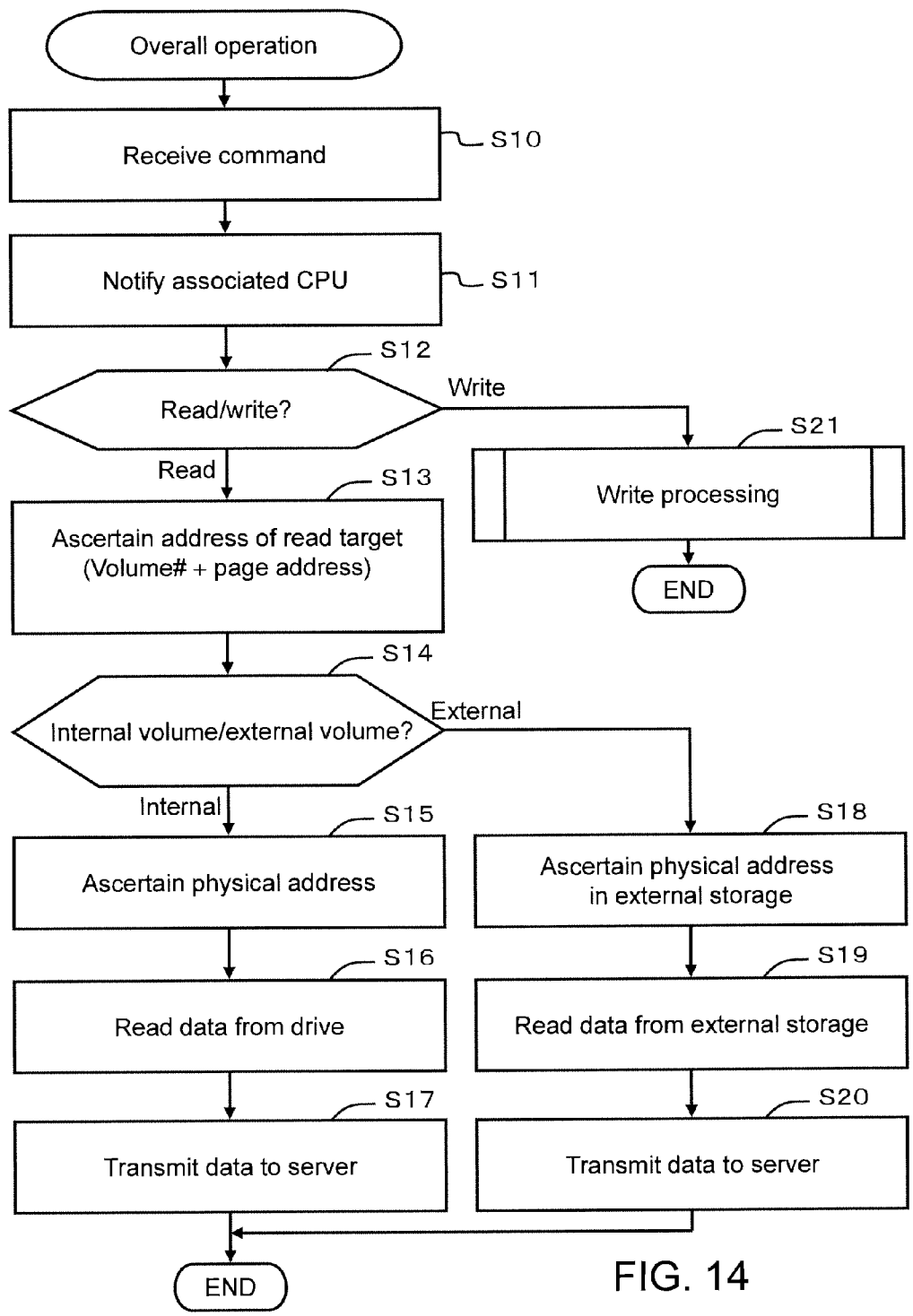
[FIG. 14]

FIG. 14 is a flowchart showing the overall operation of the storage apparatus 10. This processing is realized by the CPU 110 performing the control program P10 which the storage apparatus 10 comprises. Hereinafter, the operation is explained with the storage apparatus or the CPU as the subject. It should be noted that the explanation whose subject is the CPU may also be replaced by the explanation whose subject is the storage apparatus.

The storage apparatus 10 receives a command from the server 20 via the first communication network 40 (S10). In more details, the command issued by the server 20 is received by the FE I/F 120.

The FE I/F 120 refers to the associated CPU assignment management table T10 and identifies the CPU 110 associated with the virtual volumes 240 as the target of the command. The FE I/F 120 notifies the reception of the command to the associated CPU 110 (S11).

The CPU 110 determines the command types. The CPU 110 determines whether the received command is a read command or a write command (S12).

If the command is a read command, the CPU 110 refers to the assigned address management table T11 and identifies the page address assigned to the read target virtual page and the logical volume number in which the page exists (S13). It should be noted that identification is expressed as ascertaining in the figure.

The CPU 110 searches the logical volume-external volume conversion table T12 based on the logical volume number identified at S13 and determines whether the page assigned to the read target virtual page exists in the internal volume 220 or in the external volume 220E (S14).

If the data of the read target virtual page exists in an internal volume 220, the CPU 110 refers to the logical volume-physical disk conversion table T14. The CPU 110 identifies the RAID group 210 storing the read target data and the storage destination address of the read target data in the RAID group 210 (S15).

The CPU 110 issues a read command to the storage devices 200 configuring the identified RAID group 210, and makes the storage devices 200 transfer the data to the cache memory 140 (S16). The CPU 110 makes the FE I/F 120 transmit the data stored in the cache memory 140 to the server 20 (S17).

If the page storing the read target data is an external volume 220E, the CPU 110 refers to the logical volume-physical disk conversion table T14 and identifies the RAID group 210 storing the read target data and the storage destination address of the same (S18).

The CPU 110 issues a read command to the other storage apparatus 10 comprising the read target data and acquires the read target data from the other storage apparatus 10 (S19). The acquired data is stored in the cache memory 140. In more details, the CPU 110 transmits the read command to the other storage apparatus 10 comprising the logical volume 220 made to correspond to the external volume 220E via the FE I/F 120 and the second communication network 50. The other storage apparatus 10 reads the data from the logical volume 220 corresponding to the external volume 220E, and transmits the data to the request source storage apparatus 10 (S19).

The CPU 110 makes the FE I/F 120 transmit the data stored in the cache memory 140 to the server 20 (S20). If the command received from the server 20 is a write command, the CPU 110 performs the write processing explained later.

Figure 15:
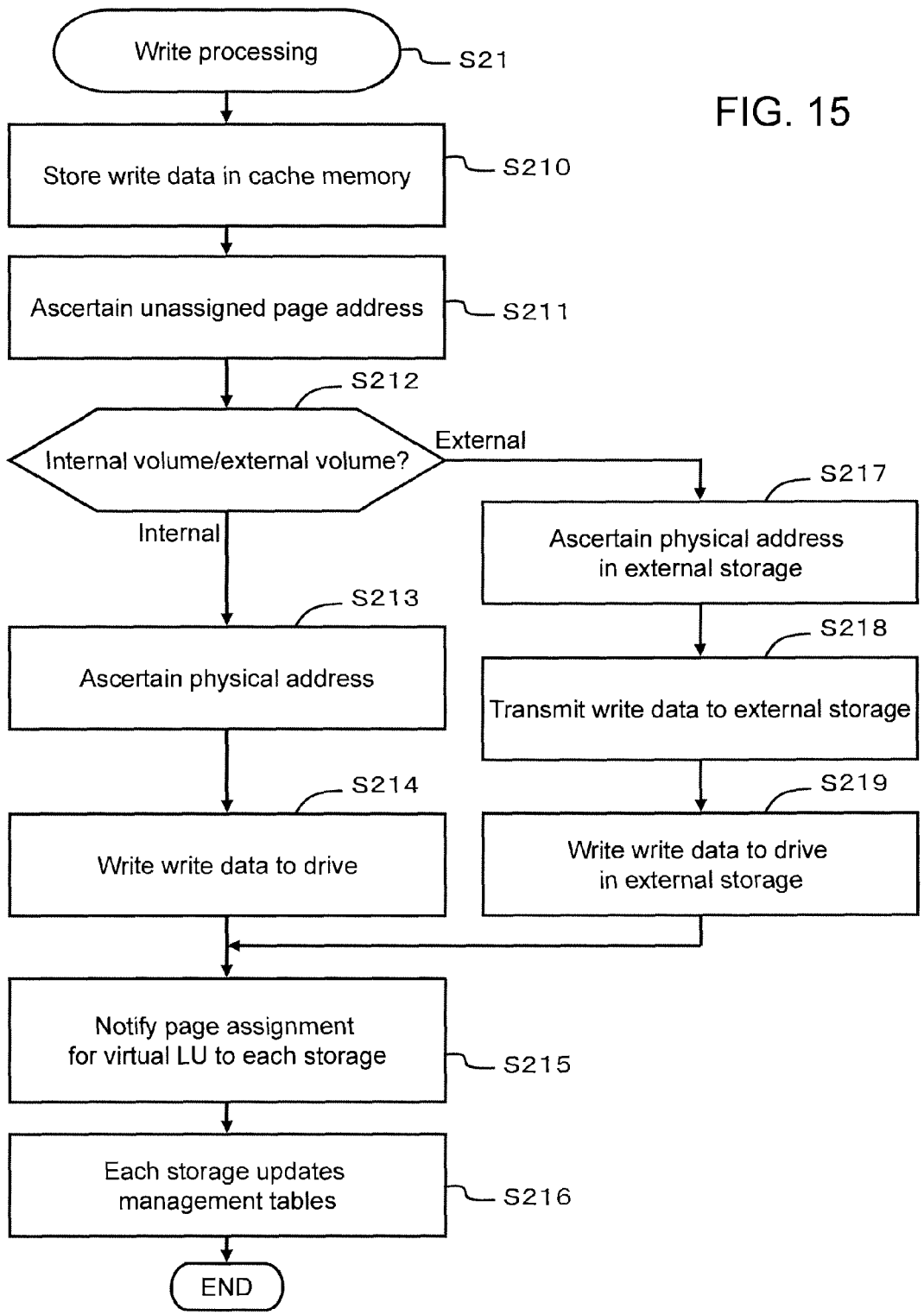
[FIG. 15]

FIG. 15 is a flowchart showing the details of the write processing (S21). At this step, the case where new data is written is explained as an example.

The CPU 110 receives the write data from the server 20 via the FE I/F 120, and stores the write data in the cache memory 140 (S210). When the write data is stored in the cache memory 140, the CPU 110 can notify the completion of the write command processing to the server 20.

The CPU 110 refers to the pool address management table T15 and selects an unassigned page (S211). Specifically speaking, the CPU 110 selects the logical volume number for writing the write data and the page address of the write destination (S211).

The CPU 110 searches the logical volume-external volume conversion table T12 based on the selected logical volume number and determines whether the write destination volume is an internal volume 200 or an external volume 220E (S212).

If the write destination volume is an internal volume 220, the CPU 110 refers to the logical volume-physical disk conversion table T14 and identifies the write destination RAID group 210 and the write destination physical address (S213). The CPU 110 transmits the write data stored in the cache memory 140 to the storage devices 200 via the BE I/F 130 and makes [the BE I/F 130] write the write data in the storage devices 200 (S214).

The CPU 110 notifies the respective other storage apparatuses 10 of the pages newly assigned to the virtual volumes 240 (S215). The respective storage apparatuses 10 which received this notification update the parts related to the page assignment in the assigned address management table T11 and the pool address management table T15 (S216).

If the write destination volume is an external volume 220E, the CPU 110 refers to the logical volume-physical disk conversion table T14 and identifies the write destination RAID group 210 and the write destination physical address (S217).

The CPU 110 transmits the write command to the other storage apparatus 10 comprising the logical volume 220 corresponding to the write destination external volume 220E. The CPU 110 transmits the write data stored in the cache memory 140 to the other storage apparatus 10 (S218). The other storage apparatus 10 stores the write data in the cache memory 140 and then writes the write data to the storage devices 200 (S219).

In the same manner as explained above, the CPU 110 notifies the respective other storage apparatuses 10 of the pages newly assigned to the virtual volumes 240 (S215).

According to the present embodiment which is configured as explained above, the effects below can be achieved. By the present embodiment, a plurality of storage apparatuses 10 are externally connected mutually, share the respective internal volumes, and generate a single pool 230. Based on the single pool 230, a plurality of virtual volumes 240 are created, and data input/output for the virtual volumes 240 are made possible for the respective storage apparatuses 10. Therefore, by the present embodiment, the servers 20 (1)-(3) can access desired virtual volumes 240 via any of the storage apparatuses 10 (1)-(3). By this method, in the present embodiment, the load can be distributed among the plurality of storage apparatuses 10 and the computer system can be operated efficiently.

Furthermore, in the present embodiment, each time a new page is assigned to the virtual volumes 240 in the pool 230, the information related to the page assignment is transmitted to the respective storage apparatuses 10, and the management tables T11 and T15 which each of the storage apparatuses 10 comprises are updated. Therefore, in the present embodiment, each time data is newly written to the virtual volumes 240, the tables T11 and T15 for managing the virtual volumes 240 can be synchronized simultaneously among the respective storage apparatuses. By this method, in the present embodiment, even if a page of the external volume is assigned to the virtual volumes 240, the occurrence of contradiction or conflict in the page assignment for the virtual volumes can be prevented. For example, the page to which the data for one virtual volume is written is assigned to the other virtual volume, which can prevent the data from being overwritten or others.

[Embodiment 2]

The Embodiment 2 is explained with reference to FIG. 16 to FIG. 19. The respective embodiments below including the present embodiment are equivalent to the variations of the above-mentioned Embodiment 1. Therefore, in the present embodiment, the differences from the Embodiment 1 are mainly explained.

Each of the storage apparatuses 10 in the present embodiment manages only the management information related to the virtual volume 240 whose owner right the storage apparatus comprises (equivalent to the second management information) and the management information related to the internal volumes 220 (equivalent to the first management information). If receiving a command in the range which the local apparatus does not manage, the storage apparatus inquires of the storage apparatus comprising the required management information and processes the command. While the management information is updated and synchronized simultaneously among the respective storage apparatuses each time the virtual volume configuration is changed in any of the storage apparatuses in the Embodiment 1, the management information is not synchronized in the present embodiment. It should be noted that the information related to the page assignment for the virtual volumes 240 may also be referred to as assignment management information or allocation information.

Figure 16:
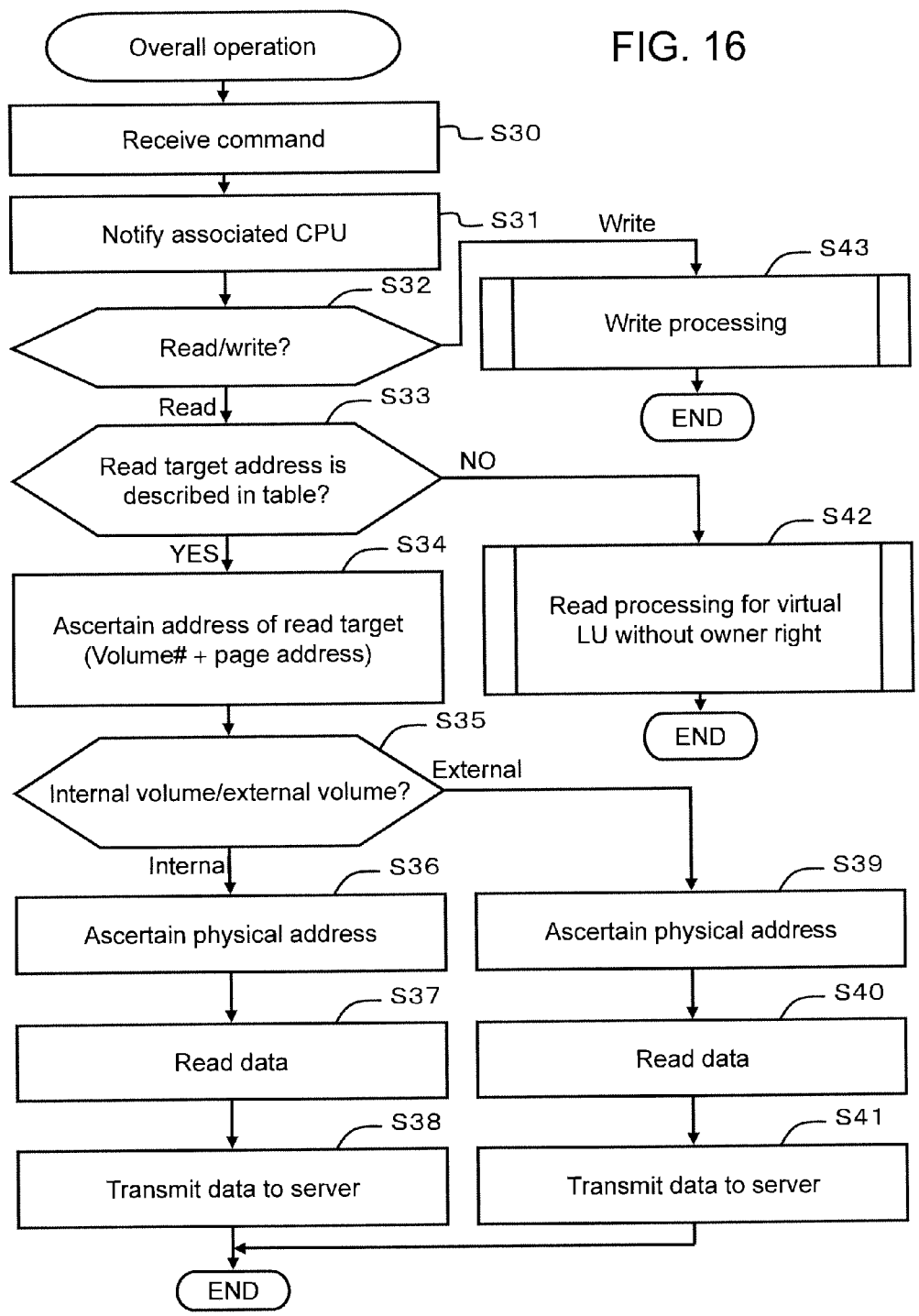
[FIG. 16]

FIG. 16 is a flowchart of the overall operation by the present embodiment. The flowchart shown in FIG. 16 is different in S33, S42, and S43 from the flowchart explained in FIG. 14 and the other steps are the same.

S30 to S32 in FIG. 16 are the same as S10 to S12 in FIGS. 14. S34 to S41 in FIG. 16 are the same as S13 to S20 in FIG. 14. Therefore, those common steps are omitted from the explanation.

S33 which is characteristic about the present embodiment is performed if the command received from the server 20 is a read command. The CPU 110 determines whether the read target page specified by the read command is already described in the assigned address management table T11 or not (S33).

In the present embodiment, the assignment information related to the virtual volumes 240 whose owner right [the storage apparatus] comprises (the information of which page in which logical volume is assigned) and the information related to the page assignment destination of the internal volumes 220 are stored in the assigned address management table T11. The assignment information related to the other virtual volumes 240 whose owner right [the storage apparatus] comprises is not stored in the assigned address management table T11.

The assigned address management table T11 (1) which the first storage apparatus 10 (1) comprises is explained as an example. It is assumed that the first storage apparatus 10 (1) comprises the owner right for the first virtual volume 240 (LUA) and does not comprise the owner right for the second virtual volume 240 (LUB) and the third virtual volume 240 (LUC).

In this case, all the management information related to the page assignment for the virtual volumes 240 (LUA) is stored in the assigned address management table T11 (1). Furthermore, in the assigned address management table T11 (1), among the management information related to the page assignment for the other virtual volumes 240 (LUB), 240 (LUC) whose owner right the storage apparatus does not comprise, the information related to the pages in the internal volume 220 in the first storage apparatus 10 (1) is stored. The other management information than the above-mentioned two types of management information is not stored in the assigned address management table T11 (1).

If the read target page specified by the read command is stored in the assigned address management table T11 (S33: YES), the same processing as explained at S13 to S20 in FIG. 14 is performed (S34 to S41).

Meanwhile, if the read target page is not stored in the assigned address management table T11 (S33: NO), the read processing for the virtual volume without the owner right which is explained later is performed (S42).

Figure 17:
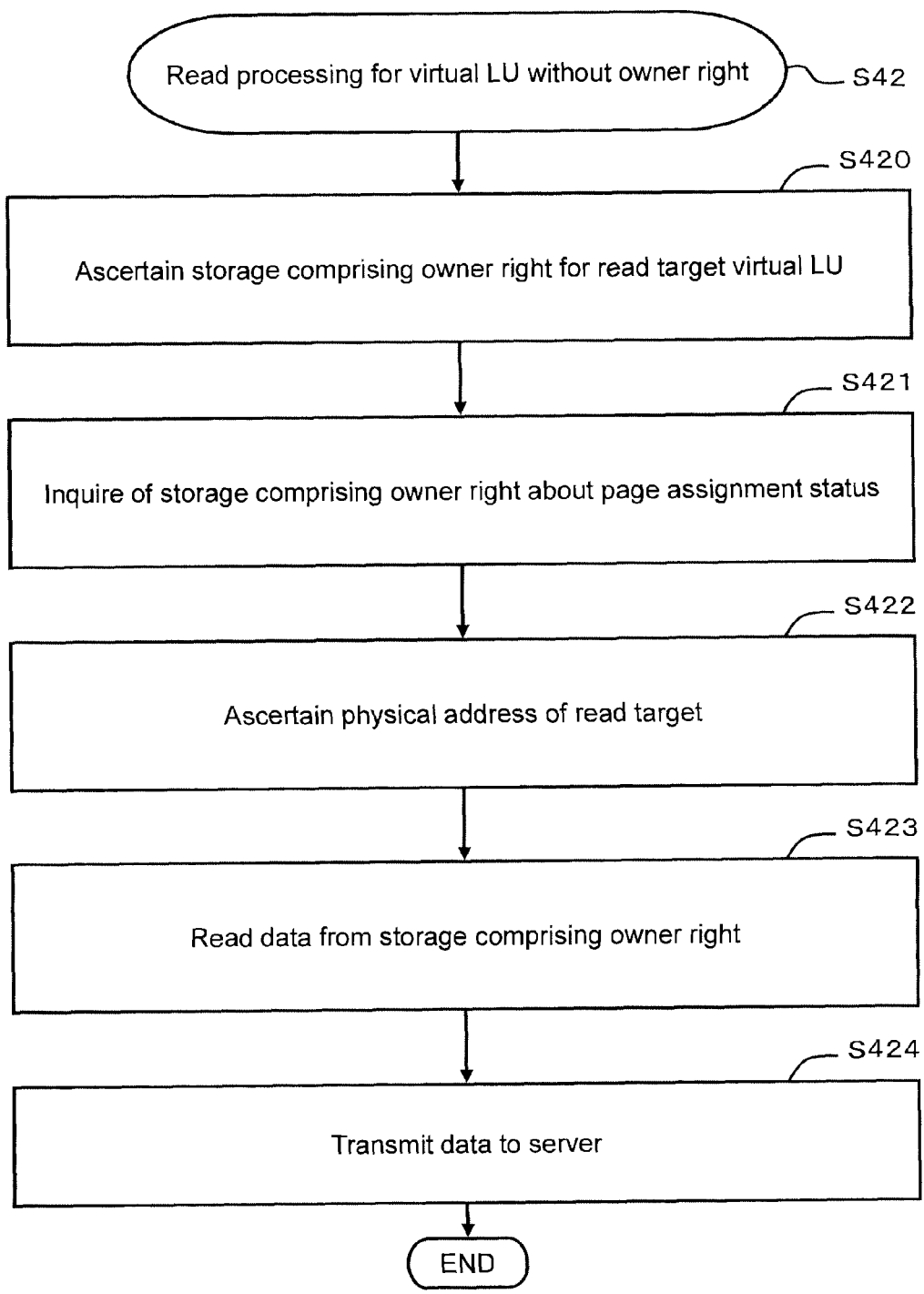
[FIG. 17]

FIG. 17 is a flowchart showing the details of the processing for reading data from the virtual volume without the owner right (S42).

The CPU 110 refers to the owner right management table T13 and identifies the storage apparatus 10 comprising the owner right for the read target virtual volume 240 (S420). The CPU 110 inquires of the storage apparatus 10 about the page assignment management information related to the read target virtual volume 240 (S421).

The storage apparatus 10 receiving the inquiry refers to the assigned address management table T11 and the pool access management table T15 and returns the page assigned to the read target virtual volume (the page in the logical volume registered in the pool) (S421).

Receiving the information related to the page assignment for the read target virtual volume, the CPU 110 refers to the logical volume-physical disk conversion table T14 and identifies the number of the read target RAID group 210 and the physical address of the read destination (S422).

The CPU 110 issues a read command to the storage apparatus 10 comprising the RAID group 210 which stores the read target data, and acquires the read target data from the storage apparatus 10 (S423).

The CPU 110 stores the read target data acquired from the other storage apparatus 10 in the cache memory 140 and then makes the FE I/F 120 transmit the data to the server 20 (S424).

At S423, instead of issuing the read command to the storage apparatus comprising the owner right for the read target virtual volume, [the CPU 110] issues the read command to the storage apparatus which actually retains the read target data.

For example, it is assumed that the apparatus receiving the read command from the server 20 is the first storage apparatus 10 (1) and that the second virtual volume 240 (LUB) is the read target. The second storage apparatus 10 (2) comprises the owner right for the second virtual volume 240 (LUB). Furthermore, it is assumed that the page in the internal volume 220 in the third storage apparatus 10 (3) is assigned to the read target virtual page among the respective virtual pages in the second virtual volume 240 (LUB).

In this case, the first storage apparatus 10 (1) inquires of the second storage apparatus 10 (2) about the location of the page storing the read target data and issues a read command to the third storage apparatus 10 storing the read target data. In case of the configuration in which the read target data is acquired from the third storage apparatus 10 (3) via the second storage apparatus 10 (2), it takes time until the first storage apparatus 10 (1) acquires the read target data. Therefore, in the present embodiment, the storage apparatus 10 which accepted the read command reads the data from the storage apparatus 10 which actually stores the data. It should be noted that the configuration in which the read target data is acquired from the other storage apparatus 10 via the storage apparatus 10 comprising the owner right may also be adopted.

Figure 18:
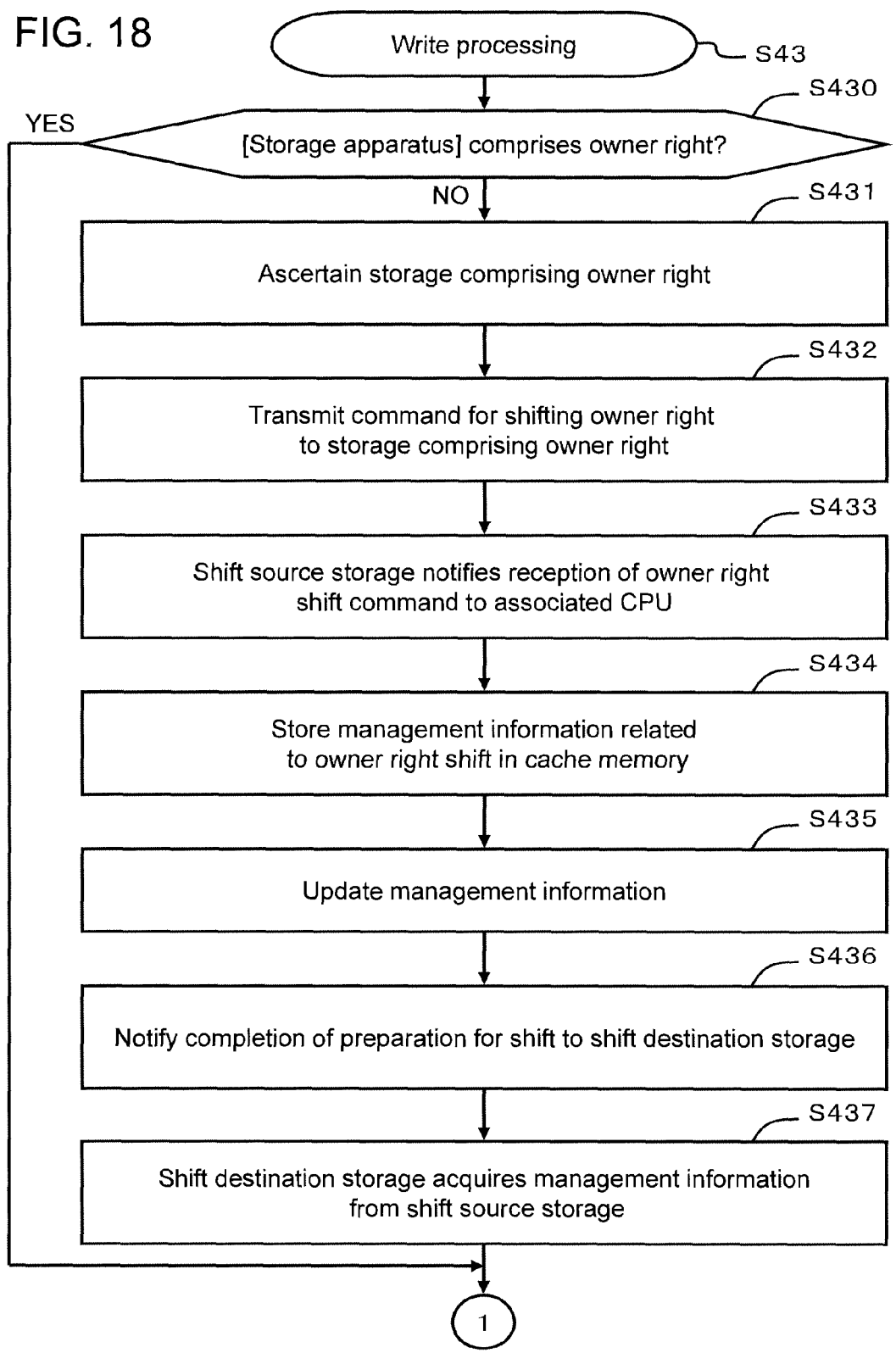
[FIG. 18]
Figure 19:
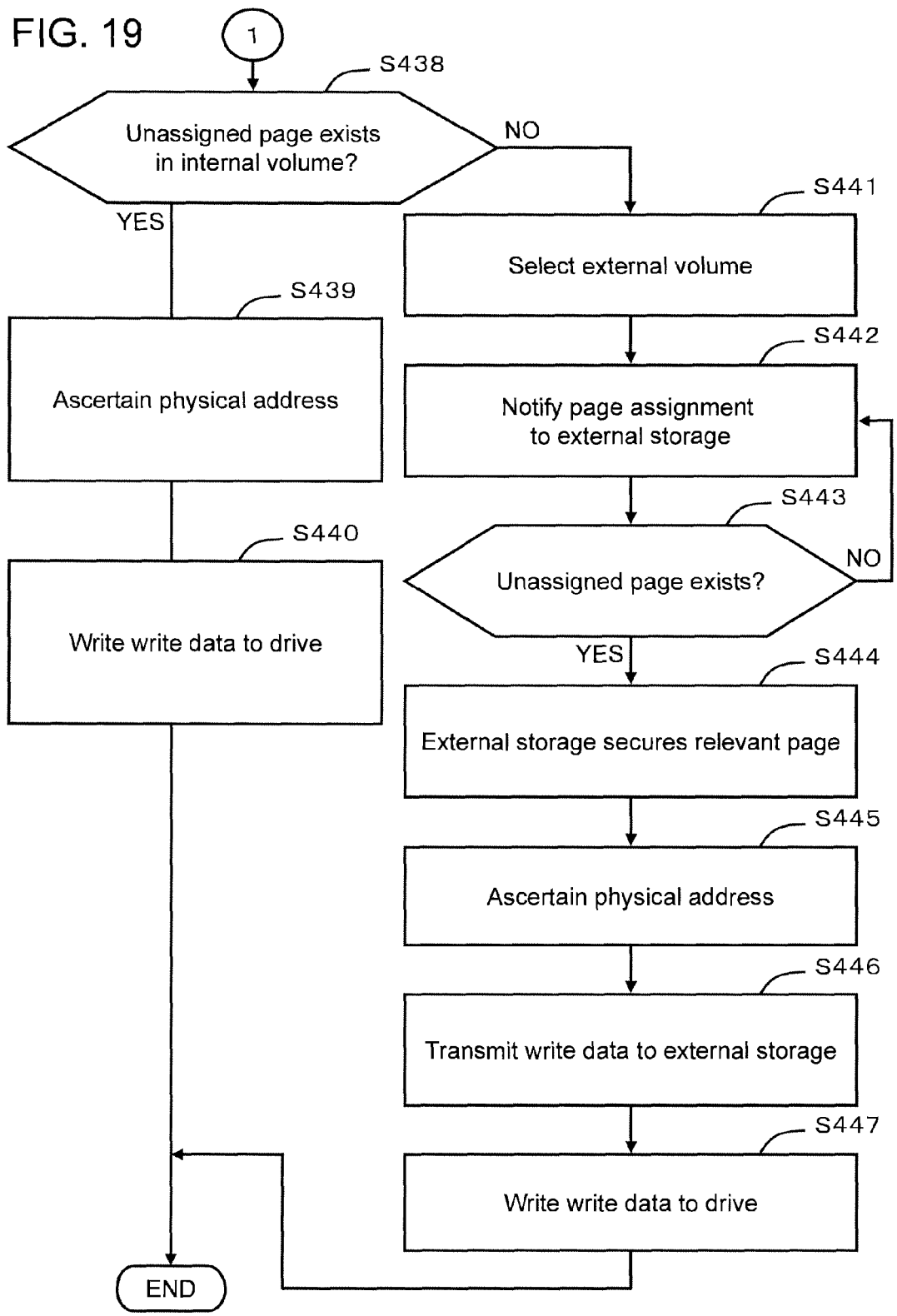
[FIG. 19]

FIG. 18 and FIG. 19 are the flowcharts showing the details of the write processing (S43) in FIG. 16. In these flowcharts, as explained later, to the storage apparatus which received the command, the owner right for the virtual volume which is the processing target of the command is shifted.

Therefore, for the ease of understanding, the explanation below is made assuming that the storage apparatus which received the command is the first storage apparatus 10 (1) and that the storage apparatus comprising the owner right for the processing target virtual volume 240 is the second storage apparatus 10 (2).

The CPU 110 (1) of the storage apparatus 10 (1) which received the write command from the server 20 refers to the owner right management table T13 (1) and determines whether [the storage apparatus] comprises the owner right for the write target virtual volume 240 or not (S430). If comprising the owner right (S430: YES), [the CPU 110 (1)] skips S431 to S437 explained later and proceeds to S438 in FIG. 19.

If not comprising the owner right (S430: NO), [the CPU 110 (1)] shifts the owner right for the write target virtual volume 240 to the storage apparatus 10 (1) which received the write command as explained below.

The CPU 110 (1) identifies the storage apparatus 10 (2) comprising the owner right for the write target virtual volume 240 (S431). The CPU 110 transmits a command for shifting the owner right to the storage apparatus 10 (2) comprising the owner right (S432).

Receiving the owner right shift command, the FE I/F 120 of the storage apparatus 10 (2) comprising the owner right refers to the associated CPU assignment management table T10 (2) and identifies the CPU 110 (2) associated with the virtual volume 240 which is the target of the owner right shift. The FE I/F 120 notifies the reception of the owner right shift command to the CPU 110 (2) (S433).

The CPU 110 (2) of the shift source storage apparatus acquires specified management information related to the virtual volume 240 which is the target of the owner right shift and stores the information in the cache memory 140 (2) in the shift source storage apparatus 10 (2) (S434).

The specified management information indicates the contents related to the virtual volume 240 which is the target of the owner right shift in the owner right management table T13 (2), the assigned address management table T11 (2), and the pool address management table T15 (2).

The CPU 110 (2) in the storage apparatus 10 (2) rewrites the specified management information stored in the cache memory 140 (2) into the contents after the owner right shift (S435). Specifically speaking, [the CPU 110 (2)] changes the number of the storage apparatus comprising the owner right for the shift target virtual volume 240 from the shift source storage apparatus 10 (2) to the shift destination storage apparatus 10 (1).

The CPU 110 (2) in the shift source storage apparatus 10 (2) notifies the CPU 110 (1) in the shift destination storage apparatus 10 (1) that the preparation for the owner right shift is completed (S436).

Receiving the notification from the storage apparatus 10 (2), the CPU 110 (1) in the shift destination storage apparatus 10 (1) acquires the specified management information stored in the cache memory 140 (2) in the shift source storage apparatus 10 (2) (S437). By using the acquired specified management information, the CPU 110 (1) updates the relevant parts in the owner right management table T10 (2), the assigned address management table T11 (1), and the pool address management table T15 (1) (S437).

FIG. 19 is referred to. The CPU 110 (1) in the storage apparatus 10 (1) which acquired the owner right refers to the pool address management table T15 (1) and determines whether the internal volume 220 comprises an unassigned page of a larger size than required or not (S438). The required size indicates the size for creating a page required for writing write data.

If an unassigned page of a larger size than required exists in the internal volume 220 (S438: YES), the CPU 110 (1) refers to the logical volume-physical disk conversion table T14 (1) and identifies the identification number of the RAID group 210 and the physical page address corresponding to the unassigned page (S439). The CPU 110 (1) transfers and writes the write data stored in the cache memory 140 (1) to the storage devices 200 comprising the storage area corresponding to the unassigned page (S440).

If the internal volume 220 in the storage apparatus 10 (1) which acquired the owner right does not comprise an unassigned page of a larger size than required (S438: NO), the CPU 110 (1) selects one external volume 220E (S441). The CPU 110 (1) selects one external volume 220E from a plurality of external volumes 220E registered in the pool 230 in accordance with a specified selection method. As the specified selection method, for example, a method in which [an external volume is] sequentially selected by using the round robin system exists. Furthermore, for example, the method in which the external volume of as high response performance as possible is selected exists. Other selection methods than explained above may also be permitted.

Hereinafter, for the ease of understanding, the explanation is made assuming that the external volume 220E which is made to correspond to the internal volume 220 in the third storage apparatus 10 (3) is selected. In the figure, the storage apparatus which is the external connection destination might be abbreviated to the "external storage".

The CPU 110 (1) notifies the storage apparatus 10 (3) which is the external connection destination that a page is assigned to the virtual volume 240 (S442). The CPU 110 (1) specifies the page address and inquires of the storage apparatus 10 (3) whether the page can be assigned to the virtual volume or not.

The storage apparatus 10 (3) which received the inquiry refers to the pool address management table T15 (3) and determines whether the notified unassigned page exists in the internal volume 220 or not (S443).

If no unassigned page exists (S443: NO), the storage apparatus 10 (3) responds as such to the storage apparatus 10 (1). The CPU 110 (1) can select another page address and inquire again (S442).

If the page address related to the inquiry is unassigned (S443: YES), the storage apparatus 10 (3) secures the unassigned page and responds to the storage apparatus 10 (1) which is the source of the inquiry (S444).

The CPU 110 (1) refers to the logical volume-physical disk conversion table T14 (1) and identifies the RAID group 210 and the physical address corresponding to the secured unassigned page (S445).

The CPU 110 (1) transfers the write data stored in the cache memory 140 (1) to the storage devices 200 in the identified RAID group 210 (S446). The write data is stored in the cache memory 140 (3) in the storage apparatus 10 (3) and written to the storage devices 200 via the BE I/F 130 (S447).

The present embodiment which is configured as explained above also achieves the same effects as the Embodiment 1. Furthermore, in the present embodiment, each of the storage apparatuses 10 only manages the information of the pages assigned to the virtual volume 240 whose owner right the storage apparatus comprises and the use status of the internal volume 220 in the local apparatus (which page is assigned to which virtual volume and other information). In the present embodiment, unlike the Embodiment 1, the assignment management information which each of the storage apparatuses comprises is not synchronized each time a page is assigned to the virtual volume 240. Therefore, since the processing required for synchronizing the assignment management information can be omitted in the present embodiment, the page assignment processing for virtual volumes can be completed relatively quickly.

In the present embodiment, only the storage apparatus 10 comprising the owner right can process write commands. As explained above, this is because each of the storage apparatus 10 only manages the information related to the page assignment for the virtual volume 240 whose owner right the storage apparatus comprises and the information of the pages assigned from the internal volume to the virtual volume.

The configuration in which the storage apparatus comprising the owner right is fixed and [the entity of the virtual server] is not shifted to the other storage apparatus 10 can also be considered, but the usability of this configuration is low. For example, if the server 20 is a virtual server created in the physical server, the case where [the owner right] is shifted from the current physical server to another physical server can be considered. It is also possible that the communication path between the shift destination physical server and the storage apparatus comprising the owner right for the virtual volume becomes longer, which might delay the communication. In such case, the response performance of the virtual volume can be maintained better by shifting the owner right for the virtual volume to as close a storage apparatus as possible to the shift destination physical server. Therefore, the present embodiment sees to it that the owner right for virtual volumes can be shifted.

It should be noted that the trigger for the owner right shift among the storage apparatuses is, for example, the case where a storage apparatus not comprising the owner right receives a write command, the case where the owner right shift is instructed from the management server 30, and others.

[Embodiment 3]

The Embodiment 3 is explained with reference to FIG. 20 to FIG. 23. The storage apparatus 10 in the present embodiment retains three types of assignment management information as explained later. The first type is the management information related to the page assignment for internal volumes. The second type is the management information related to the virtual volumes 240 whose owner right which the local apparatus comprises. The third type is the management information acquired in case of assigning pages in the external volume to the virtual volume. In the present embodiment, the information related to page assignment is acquired from the storage apparatus comprising the internal volume corresponding to the external volume and retained. Subsequently, based on the retained information, the selection of external volumes is performed.

Figure 20:
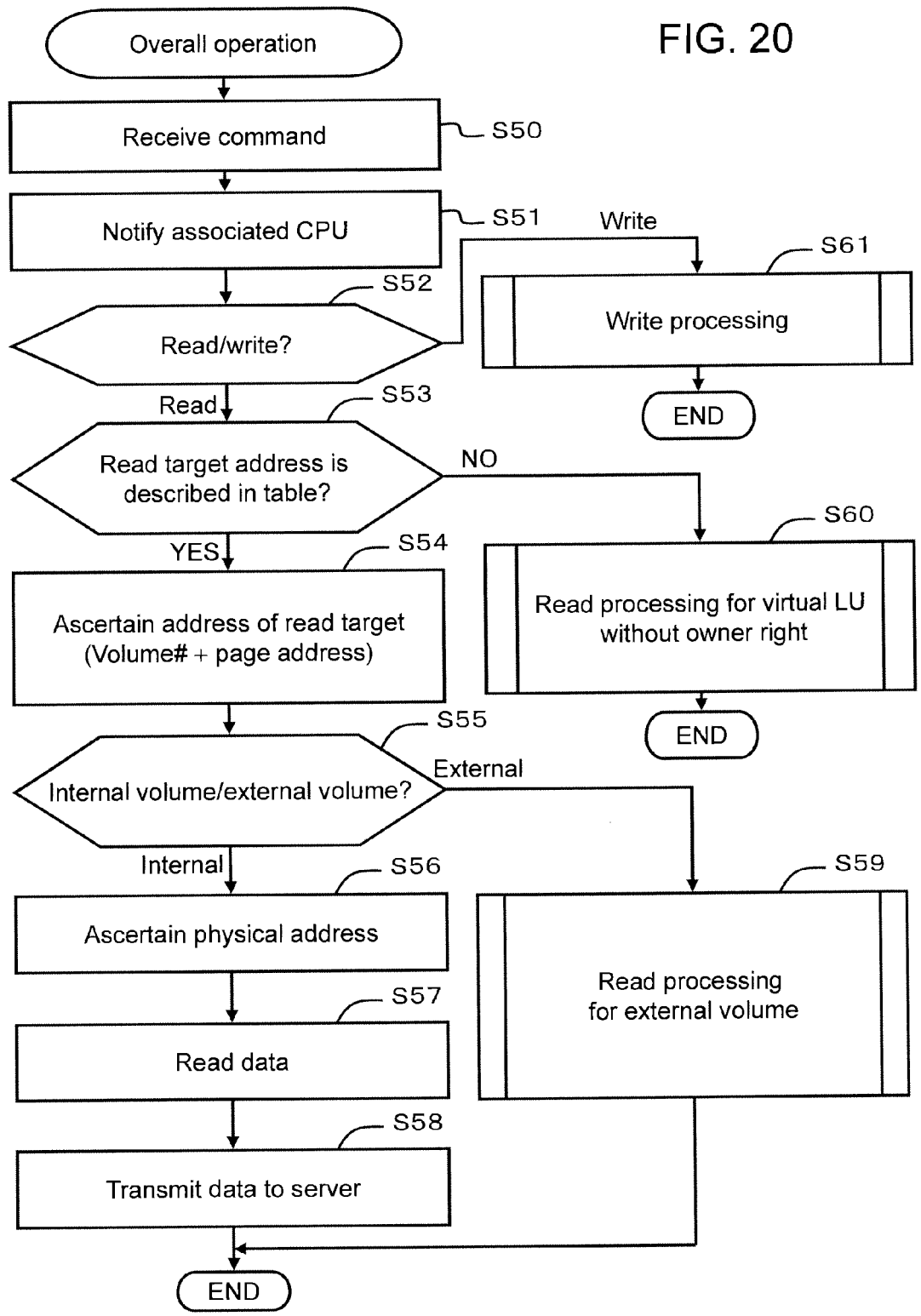
[FIG. 20]

FIG. 20 is a flowchart showing the overall operation of the storage apparatus. The differences between this processing and the processing in the Embodiment 2 (FIG. 16) are explained. Since S50 to S58 and S60 in this processing correspond to S30 to S38 and S42 shown in FIG. 16, the overlapping explanation is omitted. The present embodiment is different from the Embodiment 2 in two points, that is, the write processing (S61) and the read processing for the external volume (S59). Therefore, the read processing related to the external volume is explained first, and then the write processing is explained.

Figure 21:
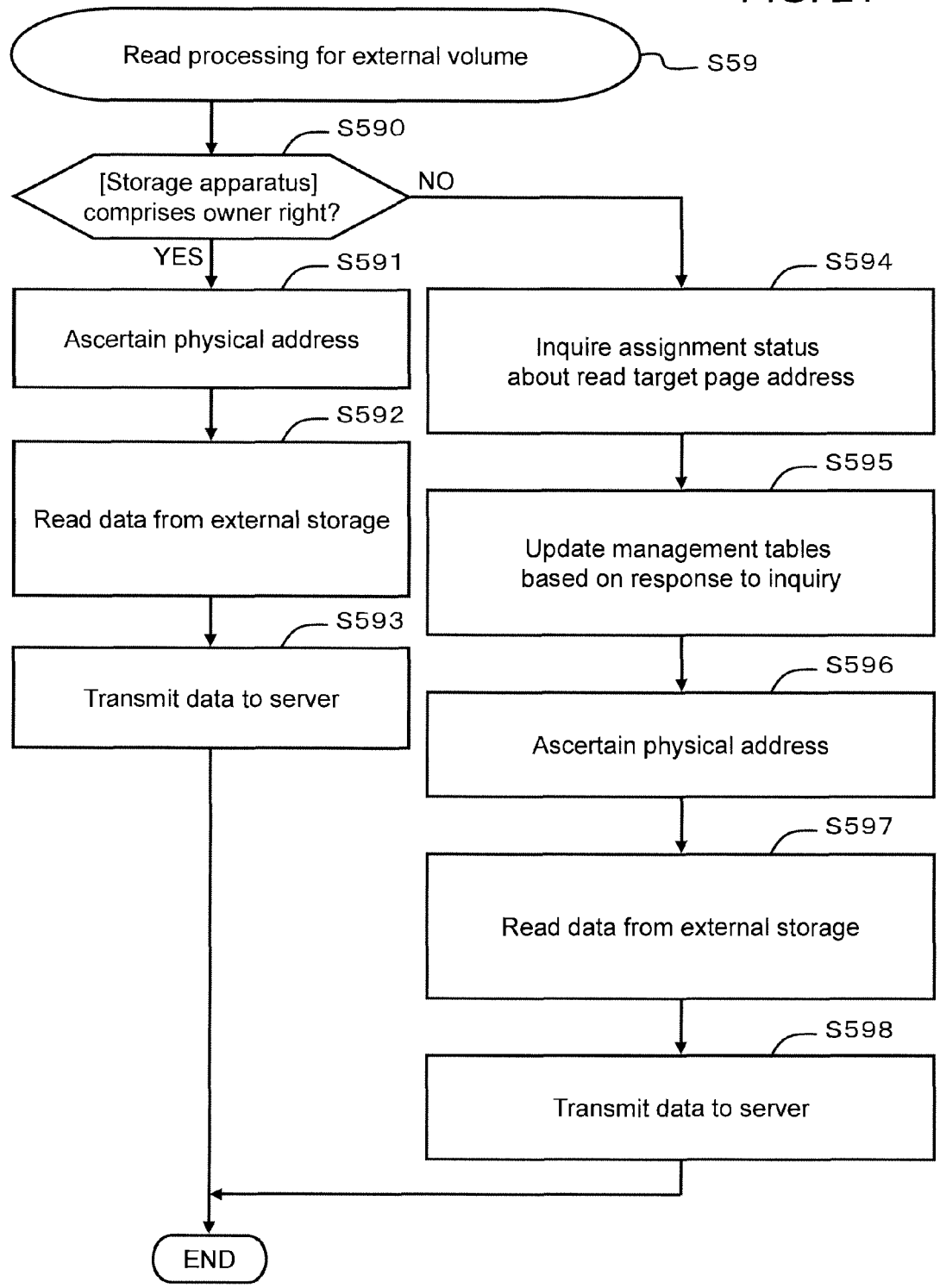
[FIG. 21]

The processing in FIG. 21 is performed if the address of the read target virtual page is described in the assigned address management table T11 (S53: YES) and, at the same time, if a page in the external volume 220E is assigned to the virtual page (S55: External).

FIG. 21 is a flowchart showing the read processing (S59) related to the external volumes. For convenience of understanding, the explanation is made assuming that the storage apparatus receiving a read command is the first storage apparatus 10 (1) and that the storage apparatus which actually stores the read target data is the second storage apparatus 10 (2).

The CPU 110 (1) in the storage apparatus 10 (1) refers to the owner right management table T13 (1) and determines whether [the apparatus] comprises the owner right for the virtual volume 240 specified by the read command or not (S590).

If comprising the owner right for the virtual volumes 240 (S590: YES), the CPU 110 (1) refers to the logical volume-physical disk conversion table T14 and identifies the number of the RAID group 210 and the physical address of the read destination storing the read target data (S591).

The CPU 110 (1) issues a read command to the external storage apparatus 10 (2) and acquires the read target data (S592). In more details, receiving the read command from the storage apparatus 10 (1), the external storage apparatus 10 (2) reads the specified data from the storage devices 200 and stores the same in the cache memory 140 (2). The external storage apparatus 10 (2) transmits the read target data stored in the cache memory 140 (2) to the storage apparatus (1) via the second communication network 50.

The CPU 110 in the storage apparatus 10 (1) makes the FE I/F 120 transmit the read target data stored in the cache memory 140 (1) to the server 20 (S593).

The case where [the storage apparatus] does not comprise the owner right for the read target virtual volume 240 (S590: NO) is explained. At this point, it is assumed that the storage apparatus (3) comprises the owner right.

The CPU 110 (1) inquires of the storage apparatus 10 (3) comprising the owner right about the page assignment for the read target virtual page. In more details, the CPU 110 (1) inquires of the storage apparatus 10 (3) via the second communication network 50 about the information of the assigned address management table T11 (3) and the pool address management table T15 (3). The storage apparatus 10 (3) extracts the information related to the virtual volume 240 which is inquired about and transfers the same to the storage apparatus 10 (1).

Based on the information acquired from the storage apparatus 10 (3), the CPU 110 (1) updates the relevant parts in the assigned address management table T11 (1) and the pool address management table T15 (1) (S595).

The CPU 110 (1) refers to the logical volume-physical disk conversion table T14 and identifies the number of RAID group and the physical address of the read destination storing the read target data (S596). It is assumed that the apparatus which actually retains the read target data is the storage apparatus 10 (2).

The CPU 110 (1) transmits the read command to the storage apparatus 10 (2) storing the read target data and acquires the read target data from the storage apparatus 10 (2) (S597). The CPU 110 transmits the read target data stored in the cache memory 140 (1) to the server 20 (S598).

As explained above, in the present embodiment, if receiving information related to the page assignment from the storage apparatus 10 (3) to the virtual volumes 240, [the storage apparatus] reflects the information in the management tables T11 (1) and T15 (1) of the local apparatus. In the present embodiment, the management information acquired from the other storage apparatus 10 (3) is retained instead of being discarded.

Figure 22:
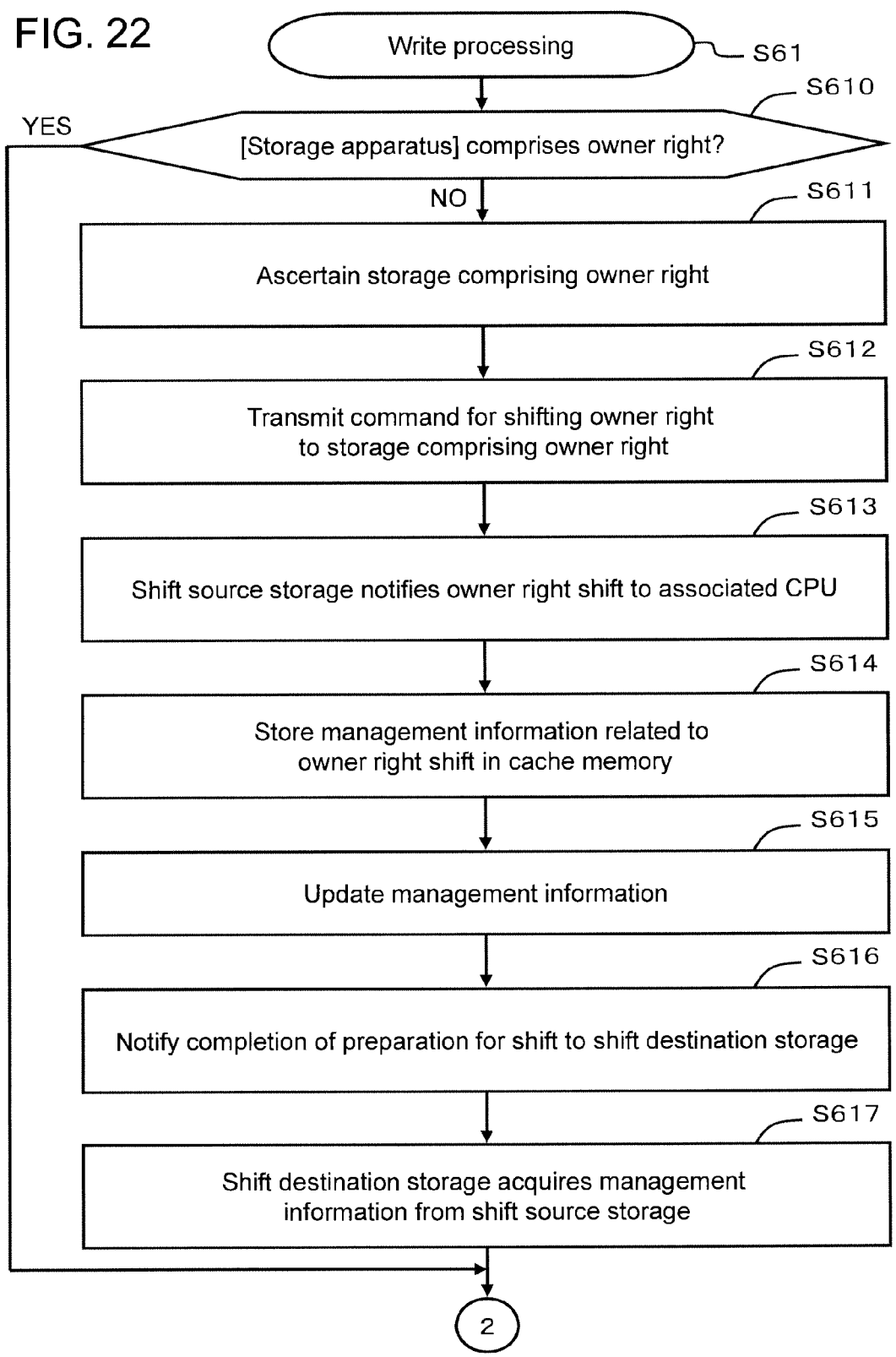
[FIG. 22]
Figure 23:
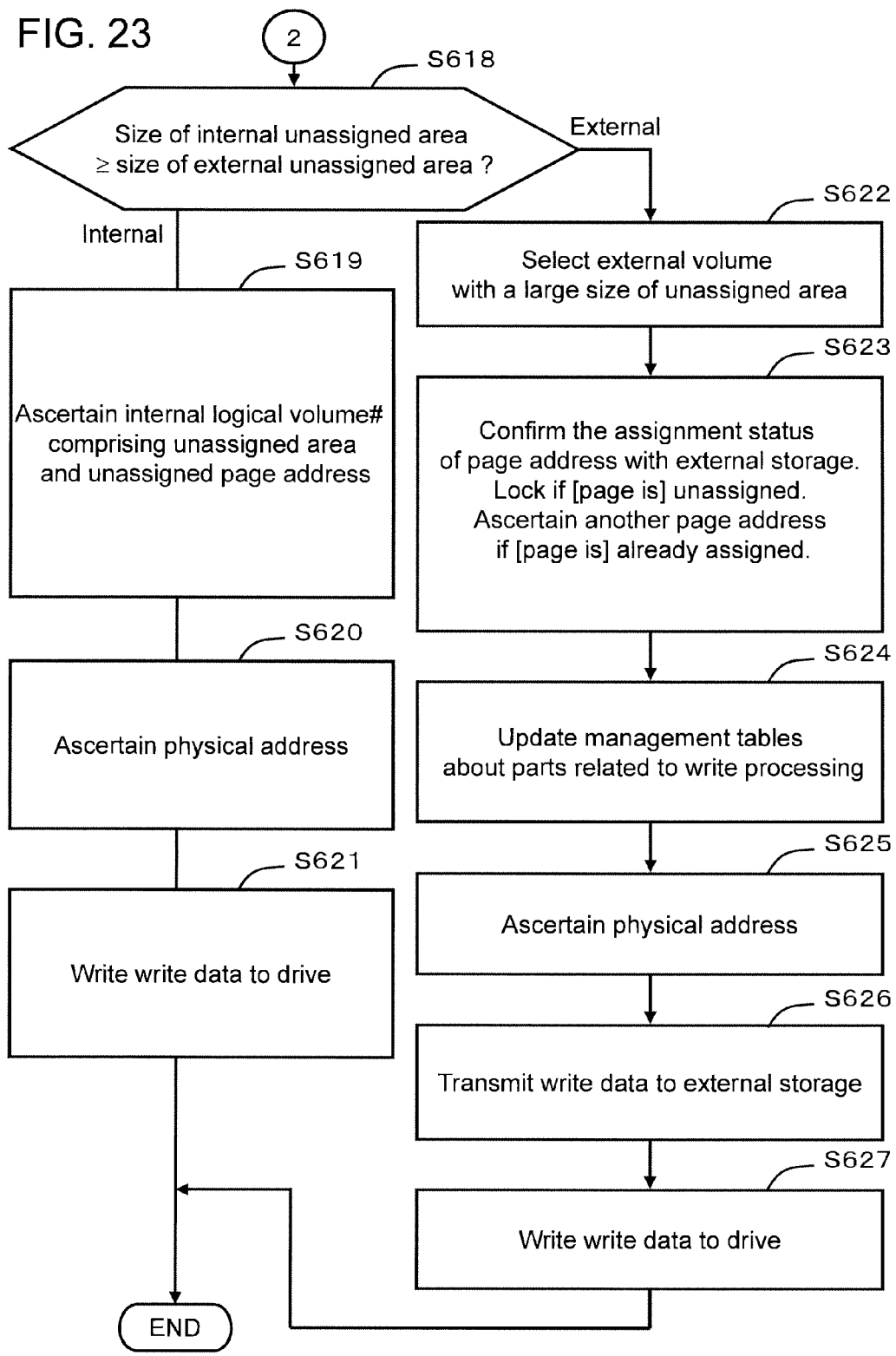
[FIG. 23]

FIG. 22 and FIG. 23 are the flowcharts showing the write processing (S60). At the steps S610 to S617 in FIGS. 22, as S430 to S437 shown in FIG. 18, the owner right is shifted to the storage apparatus which processes the write command. Therefore, the overlapping explanation is omitted.

FIG. 23 is the flowchart following FIG. 22. FIG. 23 shows the case where the storage apparatus 10 (1) which processes the write command comprises the owner right for the write target virtual volume 240.

The CPU 110 (1) refers to the pool address management table T15 (1) and the logical volume-external volume conversion table T12 (1). The CPU 110 (1) compares the size of the unassigned area which the internal volume 220 comprises with the size of the unassigned area which the external volume 220E comprises (S618).

If the size of the unassigned area which the internal volume 220 comprises is larger (S618: Internal), the CPU 110 (1) refers to the pool address management table T15 (1) and identifies the identification number and the address of the unassigned page of the internal volume (S619).

The CPU 110 (1) refers to the logical volume-physical disk conversion table T14 (1) and identifies the identification number of the RAID group 210 and the physical address of the write destination corresponding to the page to be assigned to the virtual volume 240 (the unassigned page identified at S619) (S620).

The CPU 110 (1) transfers and writes the write data stored in the cache memory 140 (1) to the storage devices 200 corresponding to the page assigned to the virtual volumes 240 (S621).

If the size of the unassigned area in the internal volume 220 is smaller (S618: External), the CPU 110 (1) selects an external volume whose unassigned area is of the largest size of the plurality of external volumes 220E registered in the pool 230 (S622). The CPU 110 (1) also selects the page address for which write is planned to be performed (S622). It is assumed that the apparatus comprising the internal volume corresponding to the external volume is the storage apparatus 10 (2).

The CPU 110 (1) inquires of the storage apparatus 10 (2) whether the page selected at S622 is assigned or not (S623). If the selected page is unassigned, [the CPU 110 (1)] locks the page (S623). If the selected page is assigned, the CPU 110 (1) selects the other page and inquires again (S623).

As for assigning the locked page to the virtual volume 240, the CPU 110 (1) updates the assigned address management table T11 (1) and the pool address management table T15 (1) (S624).

The CPU 110 (1) refers to the logical volume-physical disk conversion table T14 (1) and identifies the RAID group and the physical address of the write destination to which the write data is to be written (S625).

The CPU 110 (1) transmits the write data stored in the cache memory 140 (1) to the storage apparatus 10 (2) (S626). The storage apparatus 10 (2) stores the received write data in the cache memory 140 (2). The storage apparatus 10 (2) transfers and writes the write data from the cache memory 140 (2) to the storage devices 200 (S627).

The present embodiment which is configured as explained above also achieves the same effects as the Embodiment 1 and the Embodiment 2. Furthermore, in the present embodiment, the information related to the page assignment from the external volumes to the virtual volumes is appropriately acquired. Therefore, in the present embodiment, each of the storage apparatuses 10 can acquire a certain degree of information of the page assignment condition for the virtual volumes of the other storage apparatuses. Therefore, by the present embodiment, an external volume with a large size of unassigned area can be selected (S622). Therefore, the present embodiment achieves the more efficient use of the storage resources of the computer system than by the Embodiment 2.

[Embodiment 4]

The Embodiment 4 is explained with reference to FIG. 24. In the present embodiment, the method for creating a virtual volume is explained. The respective embodiments below including the present embodiment can be combined with the above-mentioned Embodiments 1, 2, and 3.

Figure 24:
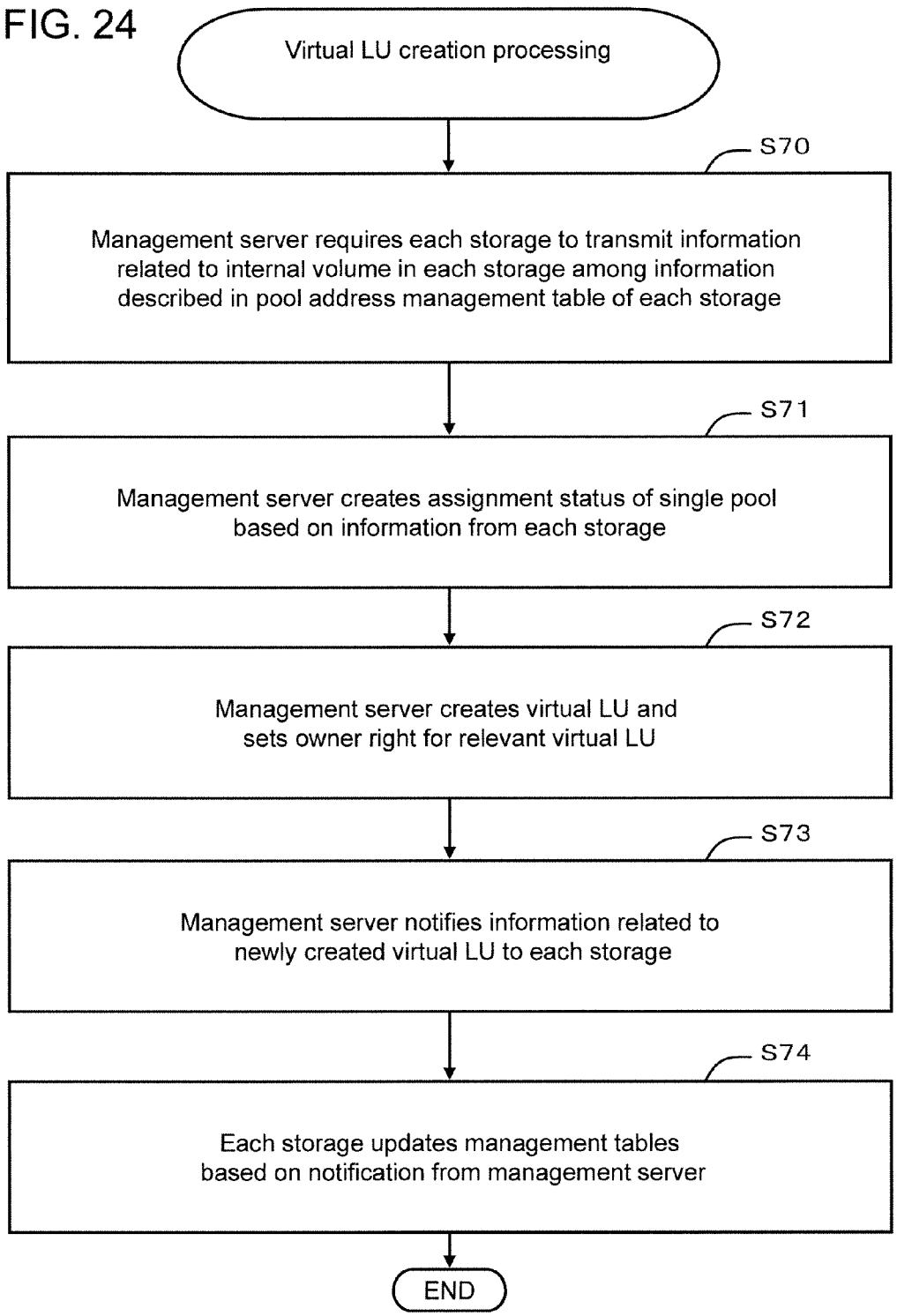
[FIG. 24]

FIG. 24 is a flowchart showing the processing for creating a virtual volume 240. The management server 30 performs the processing in FIG. 24 in accordance with the instruction from the user.

The management server 30 requires each of the storage apparatuses 10 to transmit the information related to the internal volumes 220 among the information described in the pool address management table T15 which each of the storage apparatus 10 comprises (S70). For example, [the management server 30] requires the first storage apparatuses 10 (1) to transmit the information related to the logical volume 220 in the first storage apparatus 10 (1) among the information described in the pool address management table T15 (1) to the management server 30. The same method is also applied to the second storage apparatus 10 (2) and the third storage apparatus (3).

The management server 30 creates the pool address management table T32 based on the information acquired from the respective storage apparatuses 10 (S71). Specifically speaking, the management server 30 creates the assignment condition of the single pool 230 installed in the computer system. The assignment status is the information indicating to which virtual page in which virtual volume each of the pages in the pool 230 is assigned and other information. Specifically speaking, [the assignment condition is] the information which the pool address management table T32 comprises.

The management server 30 creates a new virtual volume 240 and sets the owner right for the virtual volume 240 (S72). The management server 30 notifies the creation of the new virtual volume 240 and the owner right for the virtual volume 240 to each of the storage apparatuses 10 (S73).

Each of the storage apparatuses 10 updates the owner right management table T13 and the assigned address management table T11 which the local apparatus comprises based on the notification from the management server 30 (S74).

[Embodiment 5]

The Embodiment 5 is explained with reference to FIG. 25. In the present embodiment, the method for additionally installing a logical volume (pool volume) to the pool 230 is explained.

Figure 25:
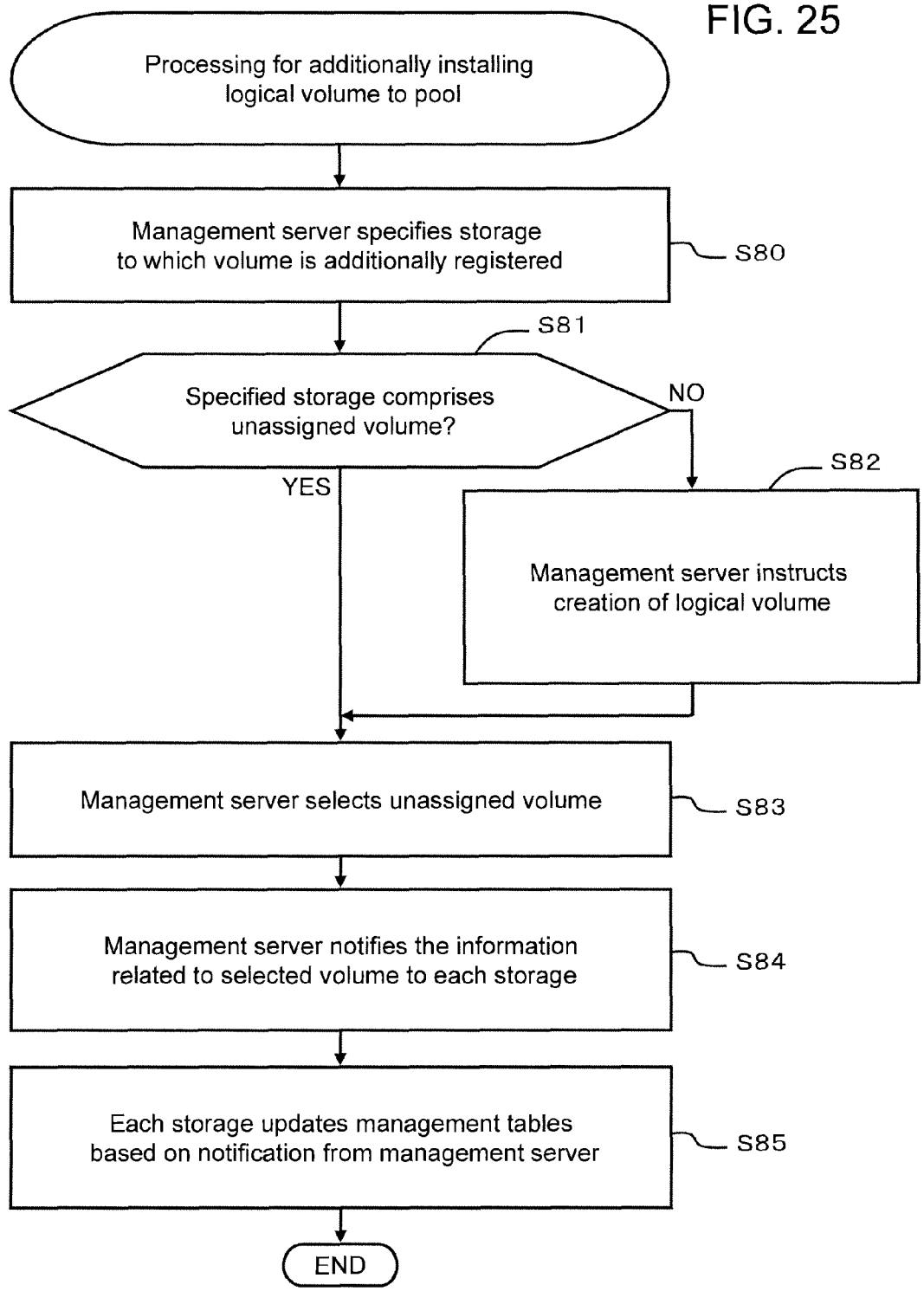
[FIG. 25]

FIG. 25 is a flowchart showing the processing for additionally installing a logical volume to the pool 230. The management server 30 performs the processing in FIG. 25 in accordance with the instruction from the user. The management server 30 specifies a storage apparatus 10 which [the management server 30] makes additionally install the logical volume to the pool 230 (S80).

For example, if it is desired to improve the response performance of the virtual volume 240, the user specifies a storage apparatus 10 of a higher performance as the provision source of the pool volume. As another method, for example, if it is desired to expand the size of the pool 230 significantly, the user specifies a storage apparatus 10 installing a larger number of storage devices 200 (i.e. comprising a larger number of storage areas) as the provision source of the pool volume.

The management server 30 determines whether an unassigned logical volume exists in the specified storage apparatus 10 or not (S81). The unassigned logical volume is the unused volume which is not registered in the pool 230.

If no unassigned logical volume exists in the specified storage apparatus 10 (S81: NO), the management server 30 instructs the storage apparatus 10 to create a logical volume (S82).

If the specified storage apparatus 10 comprises an unassigned logical volume (S81: YES) or if the specified storage apparatus 10 newly created a logical volume (S82), [the management server 30] proceeds to S83. The management server 30 selects an unassigned logical volume (S83).

The management server 30 notifies each of the storage apparatuses 10 of the information related to the logical volume which is planned to be registered in the pool 230 (the logical volume selected at S83) (S84). As the information notified to each of the storage apparatuses 10, for example, the storage apparatus number, the LDEV number, the RAID group number, the volume size, the drive type, and the corresponding drive list related to the unassigned logical volume can be named.

Each of the storage apparatuses 10 updates the logical volume-physical disk conversion table T14, the logical volume-external volume conversion table T12, the pool address management table T15, and the owner right management table T13 based on the information received from the management server 30 (S85).

[Embodiment 6]

The Embodiment 6 is explained with reference to FIG. 26 and FIG. 27. In the present embodiment, the method for deleting a virtual volume is explained.

Figure 26:
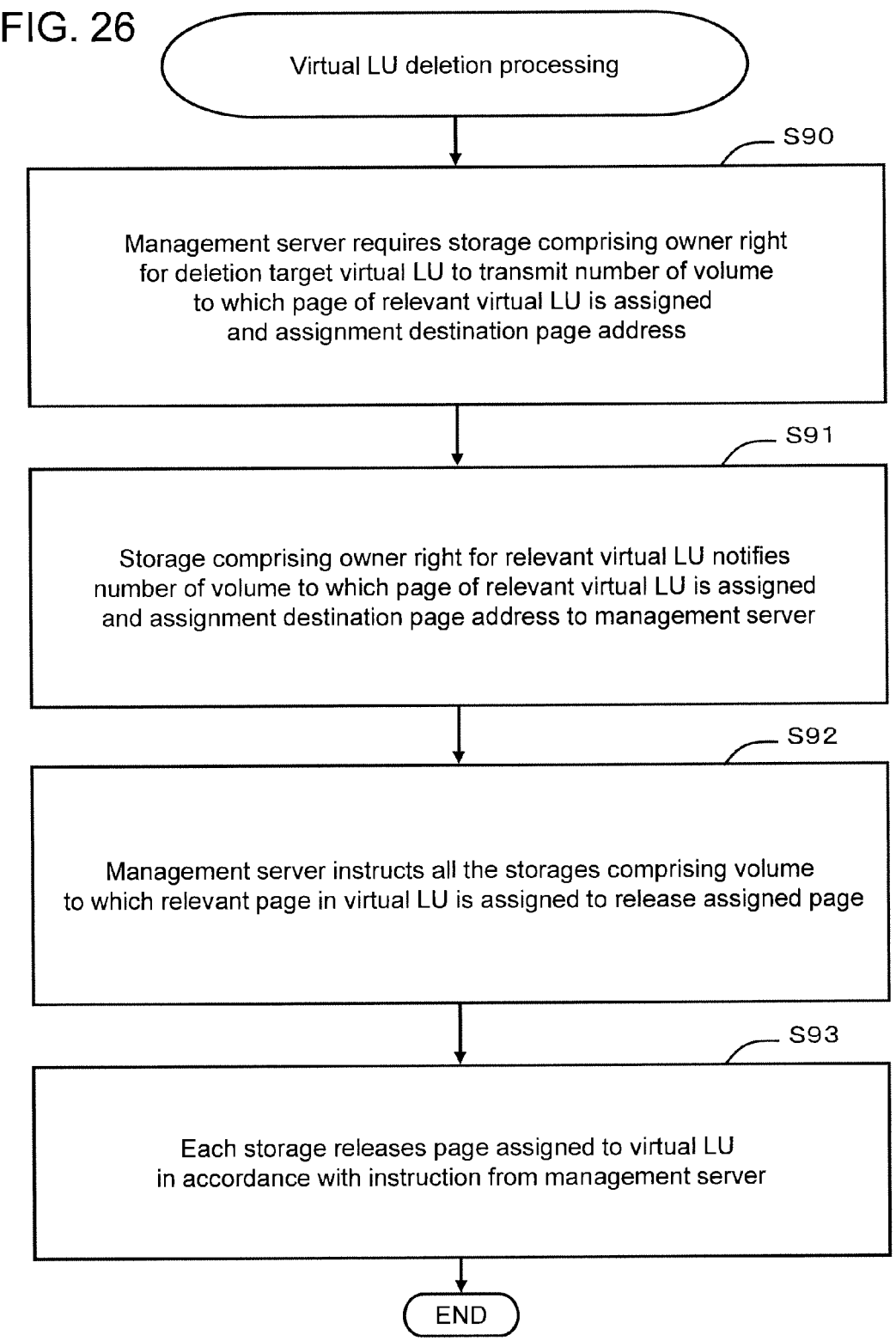
[FIG. 26]

FIG. 26 is a flowchart showing the processing for deleting a virtual volume. The management server 30 performs the processing shown in FIG. 26 in accordance with the instruction from the user.

The management server 30 has a virtual volume 240 as the deletion target specified by the user. The management server 30 requires the storage apparatus 10 comprising the owner right for the deletion target virtual volume 240 to transmit the number of the logical volume to which the virtual pages of the virtual volume is assigned and the page addresses (S90).

The storage apparatus 10 notifies the management server 30 of the addresses of the page which is made to correspond to the deletion target virtual volume 240 and the logical volume number (S91). The management server 30 instructs all the storage apparatuses 10 comprising pages assigned to the deletion target virtual volume 240 to release the assigned pages (S92). Each of the storage apparatuses 10 releases the pages in the logical volume assigned to the virtual volume 240 in accordance with the instruction from the management server 30 (S93).

Figure 27:
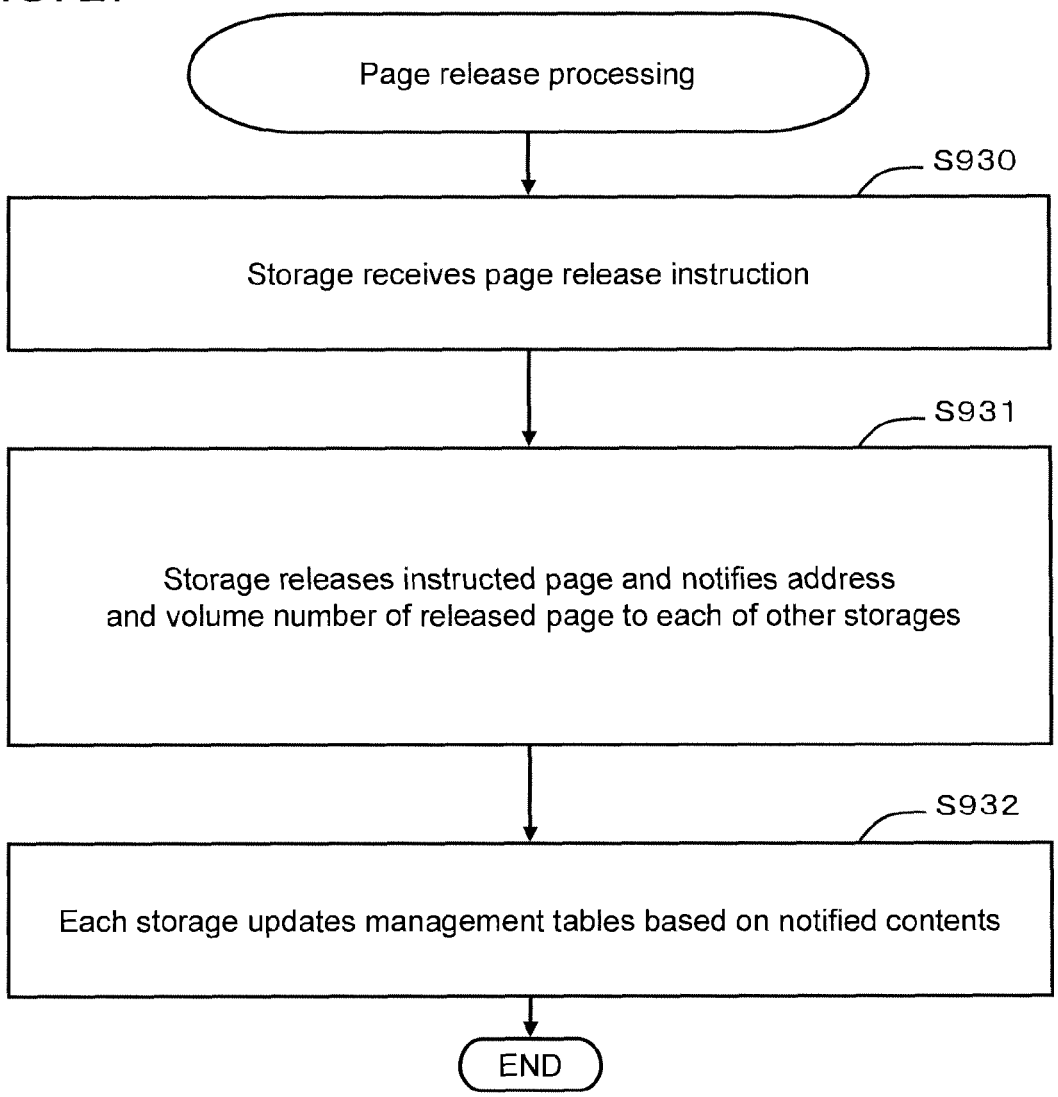
[FIG. 27]

FIG. 27 is a flowchart showing the details of the processing for releasing a page (S93). The storage apparatus 10 providing the page to the virtual volume 240 which is the target of deletion receives [an instruction for] the page release processing from the management server 30 (S930). (S930).

The storage apparatus 10 releases the instructed page (S931). Releasing the page indicates canceling the assignment of the page to the virtual volume and returning [the page] to the unassigned status. The storage apparatus 10 notifies the address of the released page and the number of the logical volume to which the released page belongs to each of the other storage apparatuses 10 (S931).

Each of the storage apparatuses 10 updates the contents of the assigned address management table T11 and the pool address management table T15 based on the notified contents (S932).

It should be noted that the present invention is not limited to the above-mentioned embodiments. Those skilled in the art can make various additions, changes, and others within the scope of the present invention.

[Reference Sign List]

10: Storage apparatus, 20: Server, 30: Management server, 100: Controller, 110: CPU, 140; Cache memory, 200: Storage device, 210: RAID group, 220: Logical volume (LDEV), 220E: External volume, 230: Pool, 240: Virtual volume

The invention claimed is:

1. A computer system, which comprises a plurality of storage control apparatuses for providing a storage area to a computer, wherein each of the storage control apparatuses is mutually connected to the other storage control apparatuses, and each of the storage control apparatuses is configured to receive access commands from the computer, each of the storage control apparatuses comprising:

a first logical storage area generated based on a physical storage area of a storage device managed by each relevant storage control apparatus of the plurality of storage control apparatuses;

a virtually generated second logical storage area, which is associated with the first logical storage areas of the other storage control apparatuses;
a pool for managing the first logical storage area and the second logical storage area:
a plurality of virtual logical volumes virtually generated based on a logical storage area of the pool, the logical storage area having a specified size, which are assigned to either the first logical storage area or the second logical storage area each time new data is written by the computer: and
a management unit configured to manage assignment management information for managing the logical storage area of the specified size assigned to a virtual logical volume of the plurality of virtual logical volumes,
wherein each of the storage control apparatuses shares at least part of the assignment management information in common with the other storage control apparatuses,
wherein the plurality of storage control apparatuses includes a first storage control apparatus and a second storage control apparatus configured to process the commands received from the computer,
wherein, when the first storage control apparatus receives a read command for a virtual logical volume provided by the first storage control apparatus, the first storage control apparatus is configured to:
determine whether one of the first logical storage area and the second storage area is assigned to the logical storage area with respect to the read command;
read, when the first logical storage area or the second storage area is assigned to the logical storage area with respect to the read command, data from the physical storage area of the first storage control apparatus:
read, when the second logical storage area or the second storage area is assigned to the logical storage area with respect to the read command, data from the physical storage area of the second storage control apparatus: and
send the data to the computer,
wherein, when the second storage control apparatus receives the read command for a virtual logical volume provided by the second storage control apparatus, the second storage control apparatus is configured to:
determine whether one of the first logical storage area and the second storage area is assigned to the logical storage area with respect to the read command;
read, when the first logical storage area or the second storage area is assigned to the logical storage area with respect to the read command, data from the physical storage area of the second storage control apparatus;
read, when the second logical storage area or the second storage area is assigned to the logical storage area with respect to the read command, data from the physical storage area of the first storage control apparatus; and
send the data to the computer,
wherein each of the storage control apparatuses is configured to:
process a command with respect to a virtual logical volume for which the relevant storage control apparatus has an owner right indicating that this relevant storage control apparatus can use this virtual logical volume exclusively from among the respective virtual logical volumes,
give preference to the first logical storage area when newly writing data to the virtual logical volume,
manage, as the assignment management information, first management information indicating a relationship between the first logical storage area and the respective virtual logical volumes, and second management information indicating a relationship between the virtual logical volume of the respective virtual logical volumes for which the relevant storage control apparatus has the owner right and the second logical storage area, and
in a case where a command is received with respect to the virtual logical volume of the respective virtual logical volumes for which the relevant storage control apparatus does not have the owner right, issue an inquiry to the storage control apparatus of the other storage control apparatuses having the owner right of the virtual logical volume, which is the processing target of the command, and process the command,
wherein each of the storage control apparatuses is configured to:
in a case where a read command is received with respect to a virtual logical volume for which the relevant storage control apparatus does not have the owner right, acquire data which is the target of the read command from the other storage control apparatus having the owner right,
in a case where a write command is received with respect to a virtual logical volume for which the relevant storage control apparatus does not have the owner right, acquire the owner right and assignment management information related to the owner right from the other storage control apparatus having the owner right,
update own second management information based on the acquired assignment management information,
assign either the first logical storage area or the second logical storage area of the specified size inside the pool to the virtual logical volume for which the owner right is acquired, and
write the write data to the assigned logical storage area.

2. A computer system according to claim 1, wherein each of the storage control apparatuses is configured to:
transmit the assignment management information related to a virtual logical volume of the respective virtual logical volumes for which a storage area assignment configuration is changed to the other storage control apparatuses, and
update the assignment management information of the other storage control apparatuses.

3. A computer system according to claim 2, wherein each of the storage control apparatuses is configured to:
transmit the assignment management information to the other storage control apparatuses, and
update the assignment management information of the other storage control apparatuses in a case where the logical storage area of the specified size is assigned to the virtual logical volume, or a case where the logical storage area of the specified size assigned to the virtual logical volume is canceled, or both.

4. A computer system according to claim 1, wherein each of the storage control apparatuses comprises a controller and the storage device, the controller being configured to control the storage device, wherein the controller comprises:
a microprocessor, a memory configured to store a specified computer program to be executed by the microprocessor, and the assignment management information,
a first communication interface unit configured so as to permit the microprocessor to communicate with the computer and the other storage control apparatuses, and
a second communication interface unit configured so as to permit the microprocessor to input/output data to/from the storage device,
wherein at least part of the assignment management information is transmitted to each of the storage control apparatuses via the first communication interface unit and shared among the respective storage control apparatuses when the microprocessor executes the specified computer program.

5. A computer system, which comprises a plurality of storage control apparatuses for providing a storage area to a computer,
wherein each of the storage control apparatuses is mutually connected to the other storage control apparatuses, and each of the storage control apparatuses is configured to receive access commands from the computer, each of the storage control apparatuses comprising:
a first logical storage area generated based on a physical storage area of a storage device managed by each relevant storage control apparatus of the plurality of storage control apparatuses;
a virtually generated second logical storage area, which is associated with the first logical storage areas of the other storage control apparatuses;
a pool for managing the first logical storage area and the second logical storage area:
a plurality of virtual logical volumes virtually generated based on a logical storage area of the pool, the logical storage area having a specified size, which are assigned to either the first logical storage area or the second logical storage area each time new data is written by the computer; and
a management unit configured to manage assignment management information for managing the logical storage area of the specified size assigned to a virtual logical volume of the plurality of virtual logical volumes,
wherein each of the storage control apparatuses shares at least part of the assignment management information in common with the other storage control apparatuses,
wherein the plurality of storage control apparatuses includes a first storage control apparatus and a second storage control apparatus configured to process the commands received from the computer,
wherein, when the first storage control apparatus receives a read command for a virtual logical volume provided by the first storage control apparatus, the first storage control apparatus is configured to:
determine whether one of the first logical storage area and the second storage area is assigned to the logical storage area with respect to the read command:
read, when the first logical storage area or the second storage area is assigned to the logical storage area with respect to the read command, data from the physical storage area of the first storage control apparatus:
read, when the second logical storage area or the second storage area is assigned to the logical storage area with respect to the read command, data from the physical storage area of the second storage control apparatus; and
send the data to the computer,
wherein, when the second storage control apparatus receives the read command for a virtual logical volume provided by the second storage control apparatus, the second storage control apparatus is configured to:
determine whether one of the first logical storage area and the second storage area is assigned to the logical storage area with respect to the read command;
read, when the first logical storage area or the second storage area is assigned to the logical storage area with respect to the read command, data from the physical storage area of the second storage control apparatus:,
read, when the second logical storage area or the second storage area is assigned to the logical storage area with respect to the read command, data from the physical storage area of the first storage control apparatus; and
send the data to the computer,
wherein each of the storage control apparatuses is configured to:
process a command with respect to a virtual logical volume for which the relevant storage control apparatus has an owner right indicating that this relevant storage control apparatus can use this virtual logical volume exclusively from among the respective virtual logical volumes,
give preference to the first logical storage area when newly writing data to the virtual logical volume,
manage, as the assignment management information, first management information indicating a relationship between the first logical storage area and the respective virtual logical volumes, and second management information indicating a relationship between the virtual logical volume of the respective virtual logical volumes for which the relevant storage control apparatus has the owner right and the second logical storage area, and
in a case where a command is received with respect to the virtual logical volume of the respective virtual logical volumes for which the relevant storage control apparatus does not have the owner right, issue an inquiry to the storage control apparatus of the other storage control apparatuses having the owner right of the virtual logical volume, which is the processing target of the command, and process the command, and
acquire the assignment management information related to the virtual logical volume, which is the target of the command, from the storage control apparatus that issued the inquiry, and update own second management information based on this assignment management information, and
wherein each of the storage control apparatuses, in a case where a read command is received with respect to a virtual logical volume for which the relevant storage control apparatus does not have the owner right, and, at the same time, a read destination of this read command is the second logical storage area, is configured to:
acquire assignment management information related to the read command and read-target data from the other storage control apparatus having the owner right,
update own second management information based on the acquired assignment management information, and
transmit the acquired read-target data to a source of the read command, and in a case where a write command is received with respect to a virtual logical volume for which the relevant storage control apparatus does not have the owner right, acquire the owner right and assignment management information related to the owner right from the other storage control apparatus having the owner right, update own second management information based on the acquired assignment management information, assign either the first logical storage area or the second logical storage area of the specified size inside the pool to the virtual logical volume for which the owner right is acquired, and write the write data to the assigned logical storage area.

6. A computer system, which comprises a plurality of storage control apparatuses for providing a storage area to a computer, wherein each of the storage control apparatuses is mutually connected to the other storage control apparatuses, and each of the storage control apparatuses is configured to receive access commands from the computer, each of the storage control apparatuses comprising:

a first logical storage area generated based on a physical storage area of a storage device managed by each relevant storage control apparatus of the plurality of storage control apparatuses;

a virtually generated second logical storage area, which is associated with the first logical storage areas of the other storage control apparatuses;

a pool for managing the first logical storage area and the second logical storage area;

a plurality of virtual logical volumes virtually generated based on a logical storage area of the pool, the logical storage area having a specified size, which are assigned to either the first logical storage area or the second logical storage area each time new data is written by the computer; and a management unit configured to manage assignment management information for managing the logical storage area of the specified size assigned to a virtual logical volume of the plurality of virtual logical volumes, wherein each of the storage control apparatuses shares at least part of the assignment management information in common with the other storage control apparatuses, wherein the plurality of storage control apparatuses includes a first storage control apparatus and a second storage control apparatus configured to process the commands received from the computer, wherein, when the first storage control apparatus receives a read command for a virtual logical volume provided by the first storage control apparatus, the first storage control apparatus is configured to:

determine whether one of the first logical storage area and the second storage area is assigned to the logical storage area with respect to the read command;

read, when the first logical storage area or the second storage area is assigned to the logical storage area with respect to the read command, data from the physical storage area of the first storage control apparatus;

read, when the second logical storage area or the second storage area is assigned to the logical storage area with respect to the read command, data from the physical storage area of the second storage control apparatus; and send the data to the computer, wherein, when the second storage control apparatus receives the read command for a virtual logical volume provided by the second storage control apparatus, the second storage control apparatus is configured to:

determine whether one of the first logical storage area and the second storage area is assigned to the logical storage area with respect to the read command;

read, when the first logical storage area or the second storage area is assigned to the logical storage area with respect to the read command, data from the physical storage area of the second storage control apparatus:

read, when the second logical storage area or the second storage area is assigned to the logical storage area with respect to the read command, data from the physical storage area of the first storage control apparatus; and send the data to the computer, wherein each of the storage control apparatuses is configured to:

process a command with respect to a virtual logical volume for which the relevant storage control apparatus has an owner right indicating that this relevant storage control apparatus can use this virtual logical volume exclusively from among the respective virtual logical volumes, give preference to the first logical storage area when newly writing data to the virtual logical volume, manage, as the assignment management information, first management information indicating a relationship between the first logical storage area and the respective virtual logical volumes, and second management information indicating a relationship between the virtual logical volume of the respective virtual logical volumes for which the relevant storage control apparatus has the owner right and the second logical storage area, and in a case where a command is received with respect to the virtual logical volume of the respective virtual logical volumes for which the relevant storage control apparatus does not have the owner right, issue an inquiry to the storage control apparatus of the other storage control apparatuses having the owner right of the virtual logical volume, which is the processing target of the command, and process the command, and acquire the assignment management information related to the virtual logical volume, which is the target of the command, from the storage control apparatus that issued the inquiry, and update own second management information based on this assignment management information, and wherein each of the storage control apparatuses, in a case where a read command is received with respect to a virtual logical volume for which the relevant storage control apparatus does not have the owner right, and, at the same time, a read destination of this read command is the second logical storage area, is configured to:

acquire assignment management information related to the read command and read-target data from the other storage control apparatus having the owner right, update own second management information based on the acquired assignment management information, and transmit the acquired read-target data to a source of the read command, and in a case where a write command is received with respect to a virtual logical volume for which the relevant storage control apparatus does not have the owner right, acquire the owner right and assignment management information related to the owner right from the other storage control apparatus having the owner right, update own second management information based on the acquired assignment management information, assign either the first logical storage area or the second logical storage area of the specified size inside the pool to the virtual logical volume for which the owner right is acquired, and write the write data to the assigned logical storage area wherein each of the storage control apparatuses, when a logical storage area of the specified size inside the pool is assigned to the virtual logical volume for which the owner rights is acquired, is configured to assign a free area in units of the specified size to the virtual logical volume in a case where the free area of a required size exists in the first logical storage area, and wherein, in a case where the required size free area does not exist in the first logical storage area, each of the storage control apparatuses, based on the assigned management information acquired from the other storage control apparatus, is configured to assign any one of the second logical storage areas from among the respective second logical storage areas that has a larger free area size to the virtual logical volume in units of the specified size.

* * * * *